US012226802B2

(12) United States Patent
Colgrove et al.

(10) Patent No.: US 12,226,802 B2
(45) Date of Patent: Feb. 18, 2025

(54) STATIC SCREENING SYSTEM AND METHODS

(71) Applicant: Derrick Corporation, Buffalo, NY (US)

(72) Inventors: James Colgrove, East Aurora, NY (US); Zachery Walleshauser, Lancaster, NY (US); Glenn Geles, East Aurora, NY (US); Layne Collins, Buffalo, NY (US)

(73) Assignee: Derrick Corporation, Buffalo, NY (US)

( * ) Notice: Subject to any disclaimer, the term of this patent is extended or adjusted under 35 U.S.C. 154(b) by 0 days.

(21) Appl. No.: 18/677,387

(22) Filed: May 29, 2024

(65) Prior Publication Data

US 2024/0399420 A1 Dec. 5, 2024

Related U.S. Application Data

(60) Provisional application No. 63/504,962, filed on May 30, 2023.

(51) Int. Cl.
*B07B 1/46* (2006.01)
*B03B 5/48* (2006.01)

(52) U.S. Cl.
CPC .............. *B07B 1/4645* (2013.01); *B03B 5/48* (2013.01); *B07B 2201/04* (2013.01)

(58) Field of Classification Search
CPC ..... B07B 1/46; B07B 1/4645; B07B 2201/04; B03B 5/48
USPC .......................................................... 209/353
See application file for complete search history.

(56) References Cited

U.S. PATENT DOCUMENTS

| | | | |
|---|---|---|---|
| 4,113,626 | A | 9/1978 | Detcher |
| 4,235,724 | A | 11/1980 | Ginaven |
| 4,250,038 | A | 2/1981 | Dryden |
| 4,422,937 | A | 12/1983 | Connolly |
| 5,282,575 | A | 2/1994 | Krulick |
| 9,120,128 | B2 | 9/2015 | Kinnunen |
| 9,174,241 | B2 | 11/2015 | Brunone |

(Continued)

FOREIGN PATENT DOCUMENTS

| | | | | |
|---|---|---|---|---|
| CA | 3145292 C | * 6/2023 | | |
| CN | 109013296 A | * 12/2018 | .............. | B07B 1/00 |

(Continued)

*Primary Examiner* — Terrell H Matthews

(74) *Attorney, Agent, or Firm* — FisherBroyles, LLP; Jason P. Mueller

(57) ABSTRACT

Static screening apparatuses that provide improved efficiency in the removal of undersized particles from oversized particles. In an embodiment, a static screening apparatus incorporates two or more (e.g., multiple) stacked screening modules allowing for adding additional screening capacity without significantly increasing space requirements for the multiple screening apparatuses. In some embodiments, a static screening apparatus utilizes specialized synthetic screening surfaces having an increased open area in relation to convention wire and wedge wire screens. The increased open area of such synthetic screen surfaces provides more efficient separation of oversized materials from undersized materials in sieve or static screen assemblies. In further embodiments, a stacked static screening apparatus may incorporate synthetic screening surfaces.

30 Claims, 26 Drawing Sheets

(56) References Cited

U.S. PATENT DOCUMENTS

| | | | | |
|---|---|---|---|---|
| 11,890,647 | B1 * | 2/2024 | Newman | B07B 1/48 |
| 2003/0127375 | A1 | 7/2003 | Gribble | |
| 2003/0173268 | A1 | 9/2003 | Watters | |
| 2009/0321328 | A1 * | 12/2009 | Wodjciechowski | B07B 1/28 209/275 |
| 2013/0098810 | A1 * | 4/2013 | Wojciechowski | B07B 1/485 209/275 |
| 2013/0313168 | A1 | 11/2013 | Wojciechowski | |
| 2017/0058621 | A1 | 3/2017 | Bailey | |
| 2021/0205741 | A1 | 7/2021 | Dai | |

FOREIGN PATENT DOCUMENTS

| | | | | |
|---|---|---|---|---|
| CN | 111215313 | | | 6/2020 |
| CN | 211100099 | | | 7/2020 |
| DE | 2923662 | | | 12/1980 |
| DE | 2924506 | | | 1/1981 |
| DE | 3043497 | | | 6/1982 |
| DE | 102013101039 | A1 | | 8/2014 |
| EA | 043698 | B1 | * | 7/2020 |
| WO | WO-2024091718 | A1 | * | 5/2024 |

* cited by examiner

STATIC SCREENING SYSTEM AND METHODS

FIELD

The present disclosure relates generally to material screening. More particularly, the present disclosure relates to apparatuses and methods for static screening of materials.

BACKGROUND

In a number of industrial applications, liquid suspensions or slurries may be fed to screening equipment to separate out solids of various sizes from the liquid or slurry. Generally, oversized materials are separated from undersized materials.

DETAILED DESCRIPTION

Figure 1A:
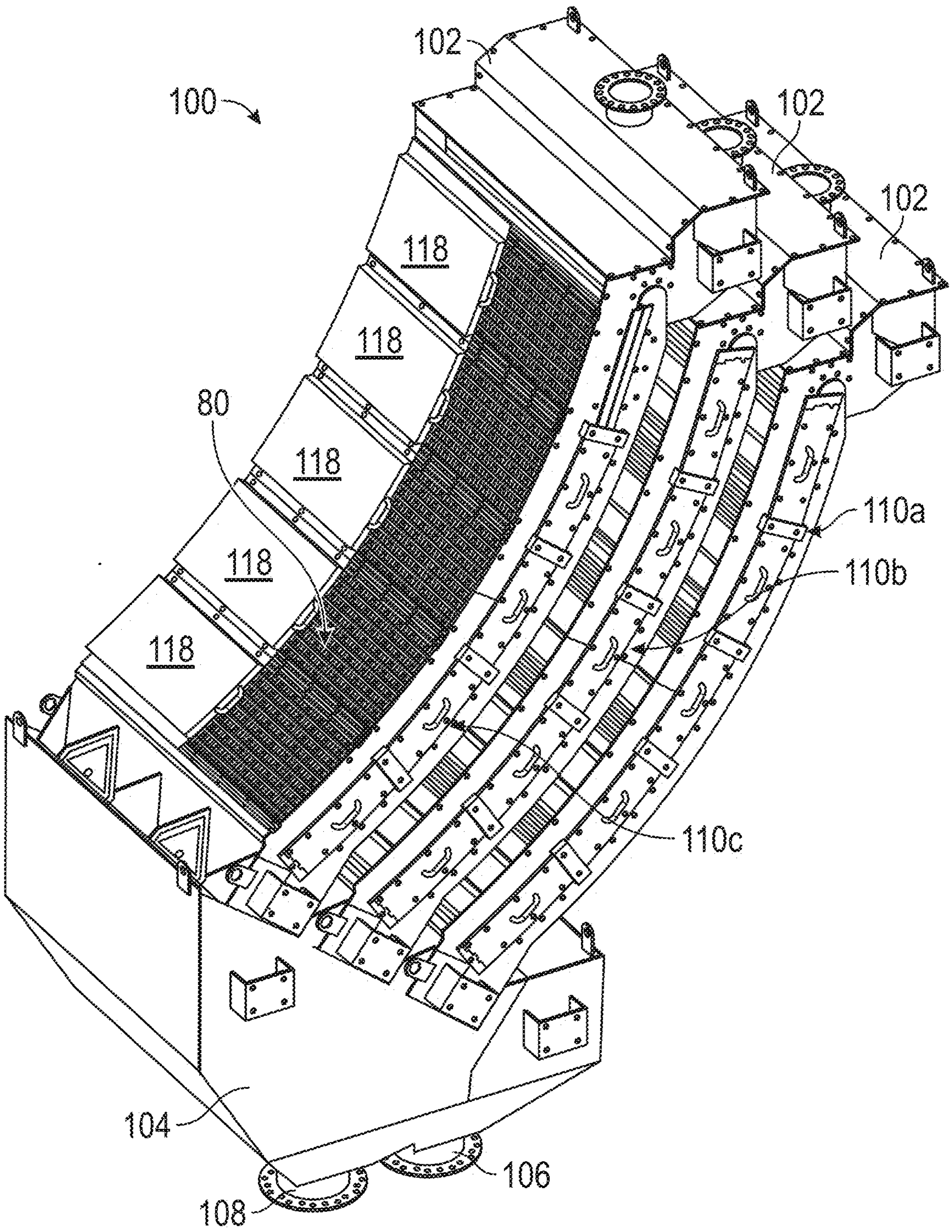
FIG. 1A shows a perspective view of a stacked static screening apparatus, in an embodiment.

Slurries can be fed into screening apparatuses to separate out solids of various sizes from a suspension liquid. In a number of such screening apparatuses, a slurry moves under the force of gravity down the face of one or more screens, which may be disposed at an angle (e.g., to the vertical and/or horizontal) to form a sloped surface. Suspension liquid (e.g., water) and undersized particles within the liquid may pass through the screen surface while oversized particles remain on the screen surface. To more effectively separate most of the undersized particles from the slurry in a gravity fed system, such screening apparatuses may utilize a concave screening area between a slurry inlet end and a slurry outlet end.

Static screening apparatuses, sometime referred to as sieve screen assemblies, are used in numerous industrial applications to process or separate materials from a slurry. Such static screening apparatuses are considered "static" as the screening surface(s) of the apparatuses are not excited (e.g., vibrated) during the screening process and instead rely primarily on gravity to move the material between inlet and outlet ends of a screening surface. However, static screening apparatuses tend to be less efficient than vibratory screening machines that vibrate screening surfaces in conjunction with movement of material over a screening surface(s). Though less efficient than vibratory screening machines, sieve or static screening apparatuses have found widespread industrial application. Such industrial acceptance is due, in part, to static screening apparatuses tending to be less complicated, have lower energy requirements and being easier to maintain than vibratory screening machines. For high volume applications, another drawback of prior static screening apparatuses is that a large number of apparatuses may be required to effectively screen such high volumes. Along these lines, considerable floor space, which is typically at a premium in industrial facilities, is required to house such a large number of static screening apparatuses.

Disclosed embodiments provide improved efficiency in the removal of undersized particles from oversized particles in static screening apparatuses. In some embodiments, a static screening apparatus incorporates two or more (e.g., multiple) stacked screening apparatuses (e.g., screening modules) allowing for adding additional screening capacity without significantly increasing space requirements for the multiple screening apparatuses. In some embodiments, static screening apparatuses utilize specialized synthetic screening surfaces having an increased open area in relation to convention wire and wedge wire screens. The increased open area of such synthetic screen surfaces provides more efficient separation of oversized materials from undersized materials in sieve or static screen assemblies. In yet further embodiments, stacked static screening apparatuses may incorporate synthetic screening surfaces.

Another potential issue with passing a slurry over an elongated screening area of a static screening apparatus is that the slurry remaining on the upper surface of the screening surface becomes progressively drier (e.g., dewatered) as it progresses between the inlet end to the outlet end of the screening surface. This may result in an undue amount of undersized material remaining within the slurry collected from the screening surface at the outlet of the static screening apparatus. To attempt to better remove the undersized particles, some screening apparatuses use one or more spray bars disposed along the screening area to re-wet the slurry remaining on the surface of the screening apparatus while it travels toward the outlet. While such spray bars assist in removing more undersized materials from the slurry, such additional water is applied to the surface of the dewatered slurry and may not admix within the interior of the dewatered slurry.

To provide improved removal of undersized particles from a slurry, aspects of the presented embodiments of screening apparatuses incorporate a slurry bath between the inlet end and the outlet end of the screening apparatus. That is, a slurry bath is incorporated into the screening area. After the slurry initially passes over one or more screening assemblies, it is reintroduced into a slurry bath or basin (e.g., trough) where the slurry may be re-wet in its entirety (e.g., re-slurried) prior to proceeding over the remainder of the screening area. Such a basin or trough allows the previously dewatered slurry to be fully rewet throughout rather than simply be surface re-wet. This results in increased removal of undersized particles in subsequent screening portions of the screening apparatus. In some aspects, the slurry basin or trough may additionally be formed of a screen surface such that the basin also provides a screening section of the screening area of a screening apparatus.

Figure 1B:
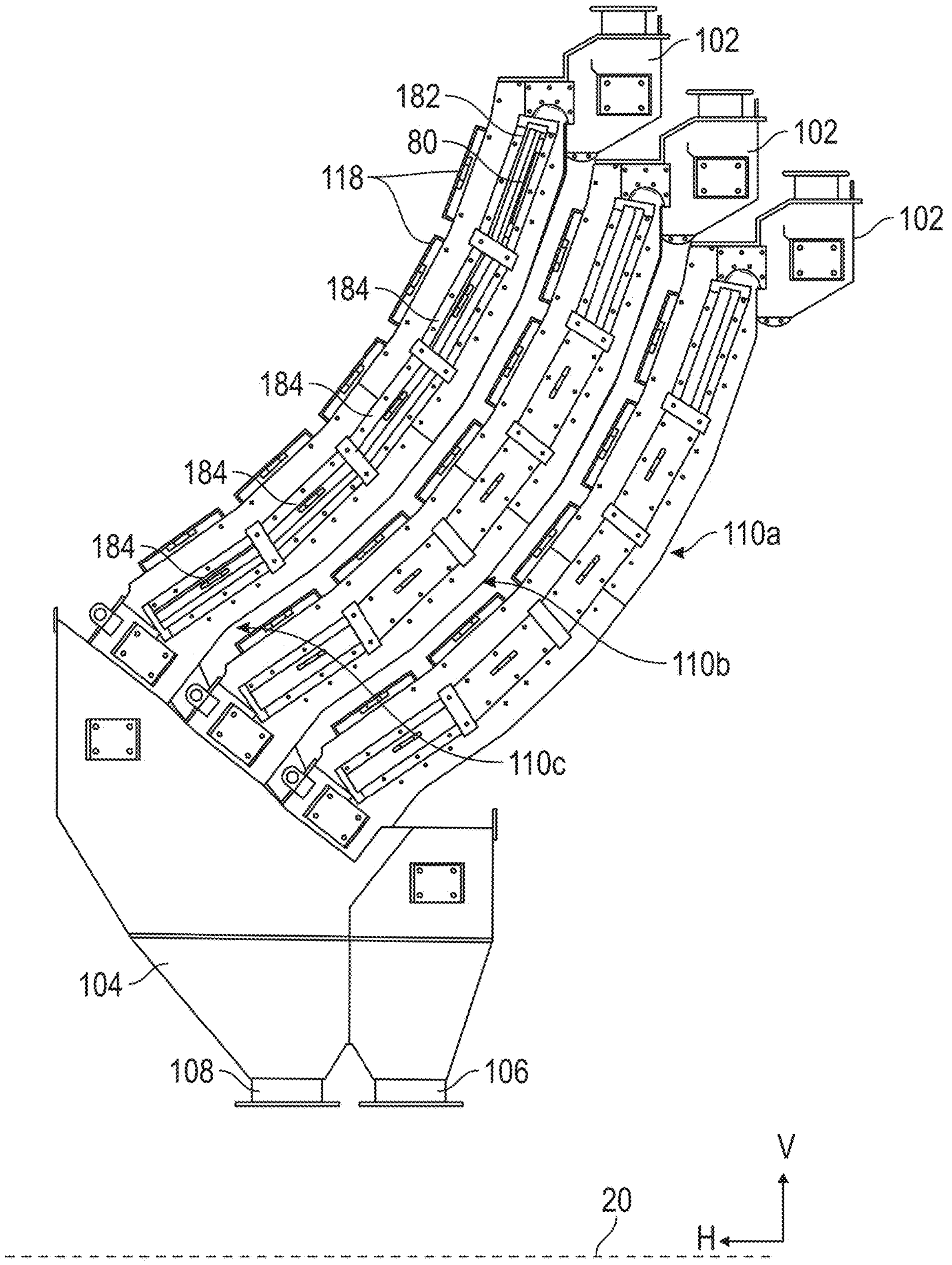
FIG. 1B shows a side view of a stacked static screening apparatus, in an embodiment.

FIGS. 1A and 1B illustrate perspective and side views, respectively, of one non-limiting embodiment of a static screening apparatus 100 that incorporates three individual screening modules 110*a*, 110*b* and 110*c*. Though referred to as individual screening modules, it will be appreciated that each individual module is an individual screening apparatus capable of separating undersized materials oversized materials. Accordingly, a screening apparatus formed from a single screening module is disclosed in FIGS. 3A and 3B, as discussed herein. The screening apparatus 100 of FIGS. 1A and 1B is a static system that relies primarily on gravity to move unscreened materials introduced at an upper end of the screening modules over screening surfaces contained in each module. Though illustrated as utilizing three individual screening modules, it will be appreciated that more or fewer modules may be utilized, and that present embodiment is presented by way of example and not by way of limitation.

As illustrated in FIGS. 1A and 1B, a first screening module 100*a* is disposed horizontally below a second screening module 100*b* (e.g., relative to a horizontal reference axis/plane 20 as shown in FIG. 1B), which is disposed below a third screening module 100*c*. That is, the apparatus 100 may include multiple individual screening modules 110 that are disposed vertically above or vertically below one or more adjacent modules. The screening modules 110*a*, 110*b*, and 110*c* (hereafter screening module(s) 110 unless specifically referenced) are stacked to provide a screening apparatus capable of processing multiple flow paths of materials using roughly the same floorspace as a single prior art static screening apparatus.

Figure 2A:
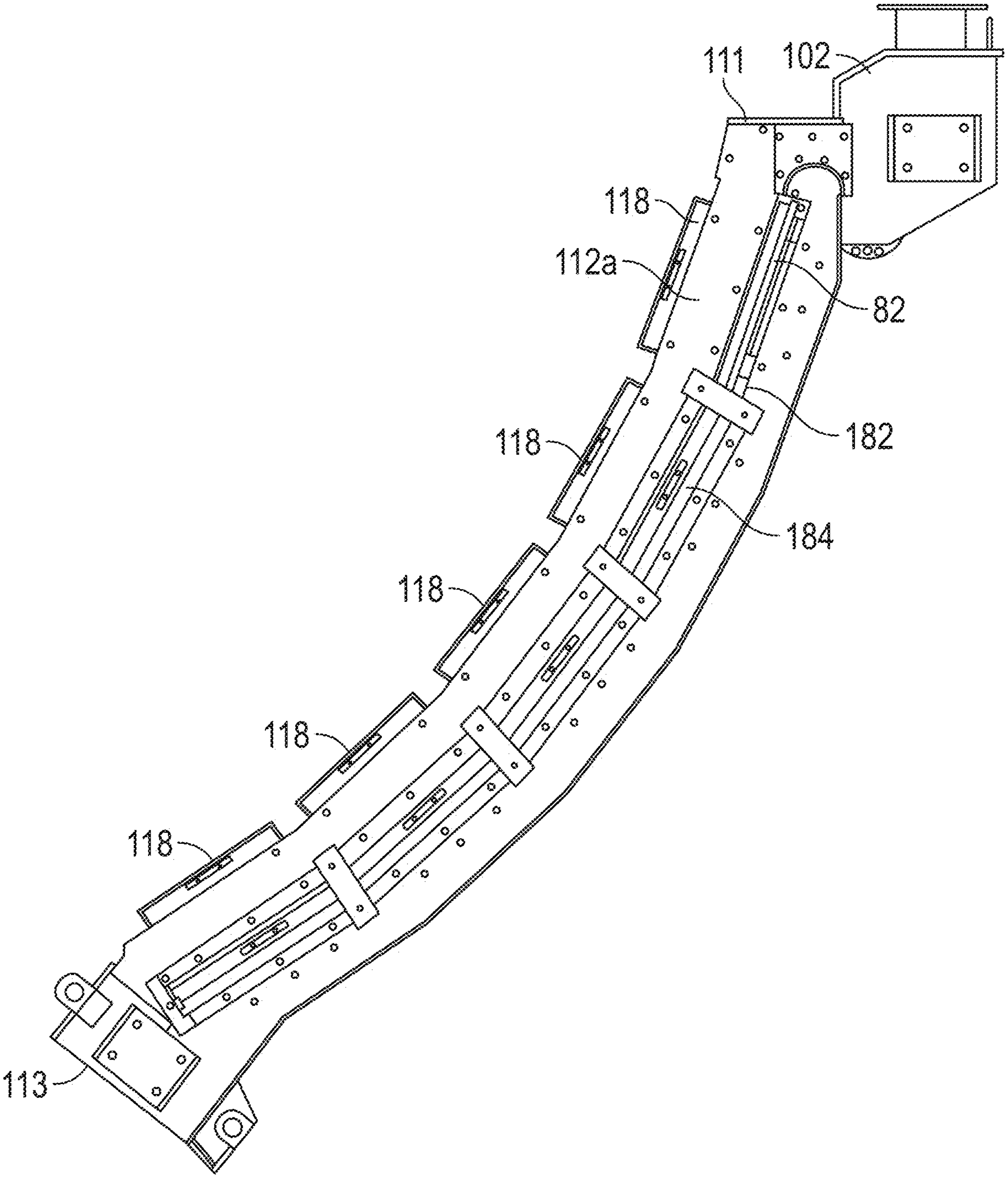
FIG. 2A shows a perspective view of an individual static screening module, in an embodiment.
Figure 2B:
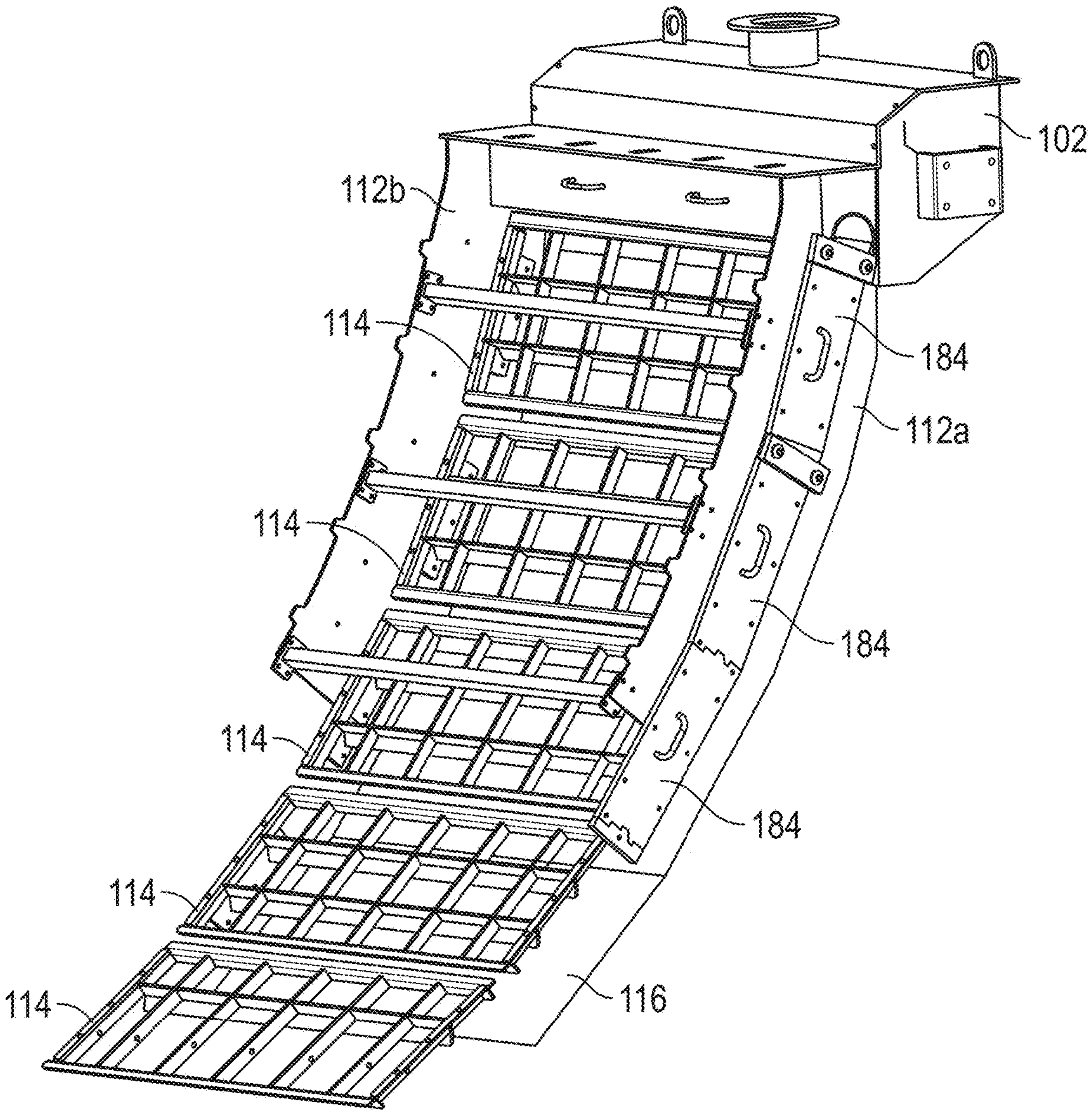
FIG. 2B shows a partial perspective view of an individual screening module, in an embodiment.

FIGS. 2A and 2B illustrate a side view and a partial perspective view, respectively, of an individual screening module 110 as utilized in the screening apparatus 100 of FIGS. 1A and 1B. Various lower components of the screening module 110 have been removed in FIG. 2B for purposes of illustration. The screening module 110 includes first and second spaced sidewalls 112*a*, 112*b* (hereafter 112 unless specifically referenced) that each extend between an upper end 111 and a lower end 113 (See. FIG. 2A). When assembled and in use, the upper ends 111 of the spaced sidewalls 112 are disposed vertically above the lower ends 113 of the spaced sidewalls 112 such that a screen surface supported by the screening module 110 may be disposed at a sloped angle (e.g., at a non-zero angle relative to a horizontal reference axis) over all or most of a length of the screen surface. The upper ends of the sidewalls 112 generally define an inlet end of a screening bed of the screening module 110 while the lower ends 113 of the sidewalls defines an outlet end of the screening bed of the screening module 110. As illustrated, the first and second sidewalls 112 are generally arcuate between their first and second ends. However, this is not a requirement. A plurality of support members or cross-support frames 114 (e.g., bulkheads or stringers) extend between inside surfaces of the wall members 112. In the present embodiment, the screening module 110 includes five cross-support frames 114 disposed adjacent to one another between the upper and lower ends of the sidewalls 112. Other configurations are possible. In the illustrated embodiment, the five cross-support frames 114 collectively define a concave screening bed that collectively support a correspondingly concave screening surface 80 (see, e.g., FIGS. 1A and 4A). The cross-support frames 114 are attached to the sidewall members 112 between upper and lower edges of the sidewalls 112. The cross-support frames are configured to support a screening surface between the sidewalls 112, below the upper edges of the spaced sidewalls 112 and above the lower edges of the spaced sidewalls 112. A solid bottom surface 116 (see FIG. 2B) extends between the lower edges of the spaced sidewalls 112. In use, undersized materials passing through a screening surface 80 supported by the cross-support frames 114 are collected on the solid surface 116 extending between the bottom edges of the sidewalls 112. The collected undersized materials slide to an outlet end of the screening module 110 for collection. In an embodiment, an area above the screening surface 80 may be covered by one or more panels 118 to enclose a material flow path through the screening module 110. As shown in FIG. 1A, one half of the panels 118 are removed to illustrate the underlying screen surface 80. In an embodiment, the panels 118 may be inserted from one or both sides of the screening module 110 to allow inserting the panels 118 on a screening module when the screening module 110 is disposed below another screening module.

The screening module 110 includes an inlet feeder 102 attached to the upper ends 111 of the sidewalls 112. Slurry is initially fed into the slurry inlet feeder 102. Within the feeder 102 (e.g., hopper) the slurry may be agitated and/or mixed with additional liquid. Slurry in the inlet feeder 102 spills over a weir at an upper end of the inlet screening module 110 and onto a top surface of the screen surface 80. The material flows down the screen surface 80 during which under sized materials pass through the screen surface 80. One or more spray bars (not shown) may provide additional fluid (e.g., water) to the slurry as it passes down the screen surface 80. Undersized materials passing through screen surface 80 are collected on the solid bottom surface 116 of the screening module 110 and pass over an outlet end of the solid surface 116. Oversized materials remain on an upper surface of the screening surface 80 and pass over an outlet end of the screening surface 80.

In the illustrated embodiment, the lower end of the screening modules 110*a*, 110*b* and 110*c* are connected to a collection hopper 104. In an embodiment, the undersized materials exit the screening apparatus 100 through an undersized material discharge port 108 while oversized materials exit the screening apparatus 100 through a separate fluidly isolated oversized material discharge port 106.

Figure 1C:
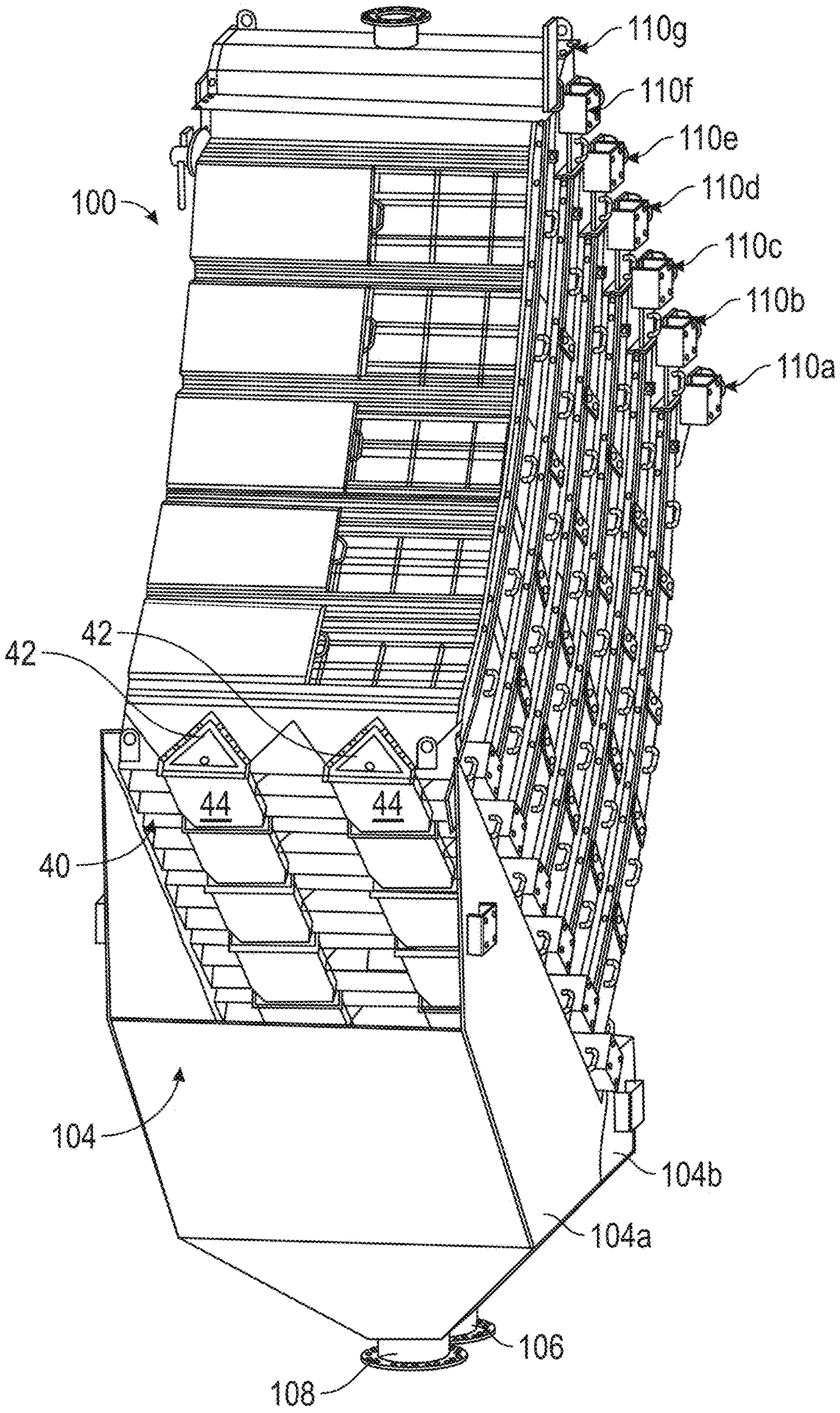
FIG. 1C shows a perspective view of another stacked static screening apparatus, in an embodiment.

FIG. 1C illustrates a further embodiment of a static screening apparatus 100 that incorporates seven individual screening modules 110*a*, 110*b*, 110*c*, 110*d*, 110*e*, 110*f* and 110*g*, which each discharge into a collection hopper 104. The collection hopper 104 includes a forward material hopper 104*a* for collecting undersized materials passing over the outlet ends of the solid bottom surfaces of the modules 110*a-g* and a rearward collection hopper 104*b* for collecting oversized materials passing over the outlet ends of supported screen surfaces of the modules 110*a-g*. Internally, the collection hopper 104 includes a dividing wall (not shown) for isolating the forward and rearward collection hoppers 104*a*, 104*b*. As illustrated, a forward surface of the collection hopper 104 has been removed to illustrate an internal baffling assembly 40 that allows for collection and isolation of oversized materials passing over the outlet ends of the screen surfaces and undersized materials passing over the outlet ends of the solid bottom surfaces of the screening modules.

Figure 1D:
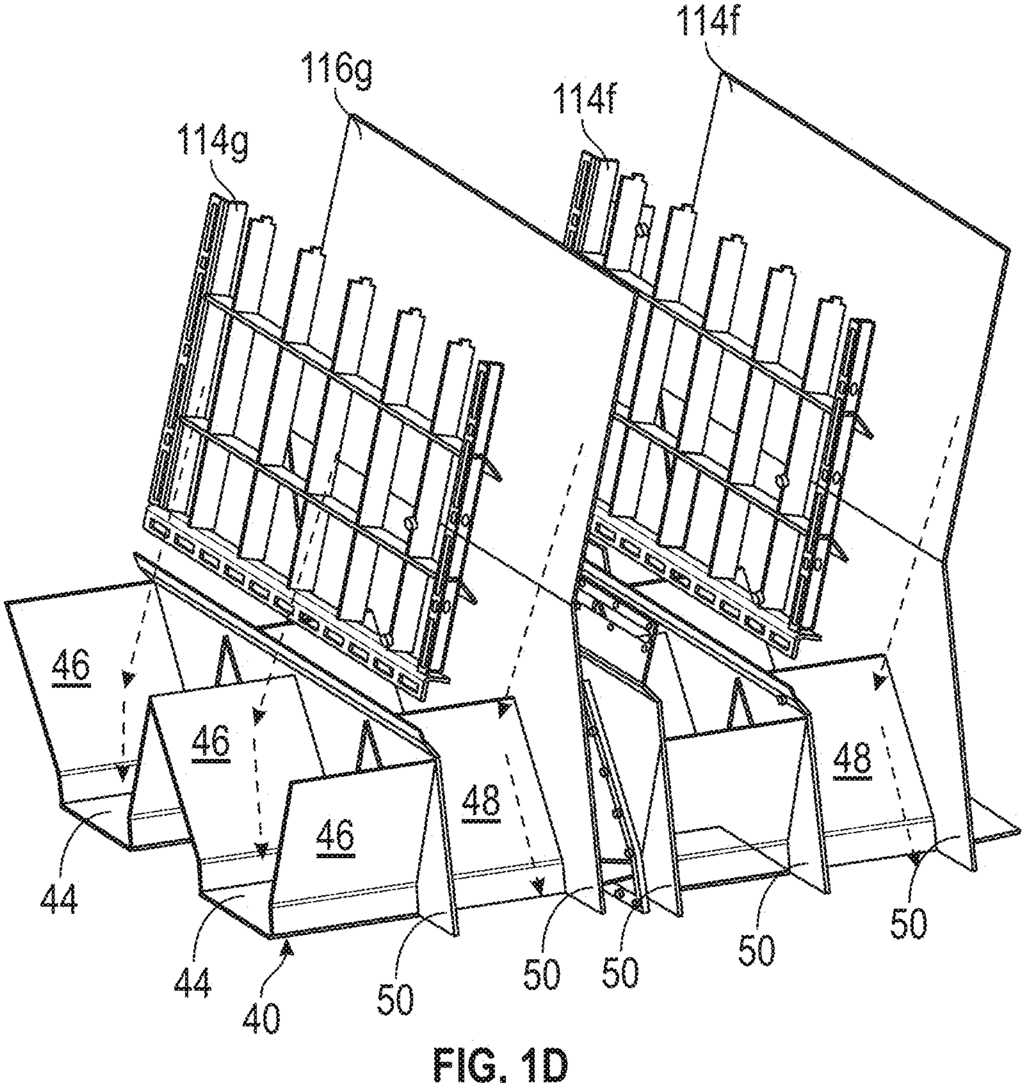
FIG. 1D shows a partial perspective view of internal baffling of the stacked screening apparatus of FIG. 1C, in an embodiment.
Figure 1E:
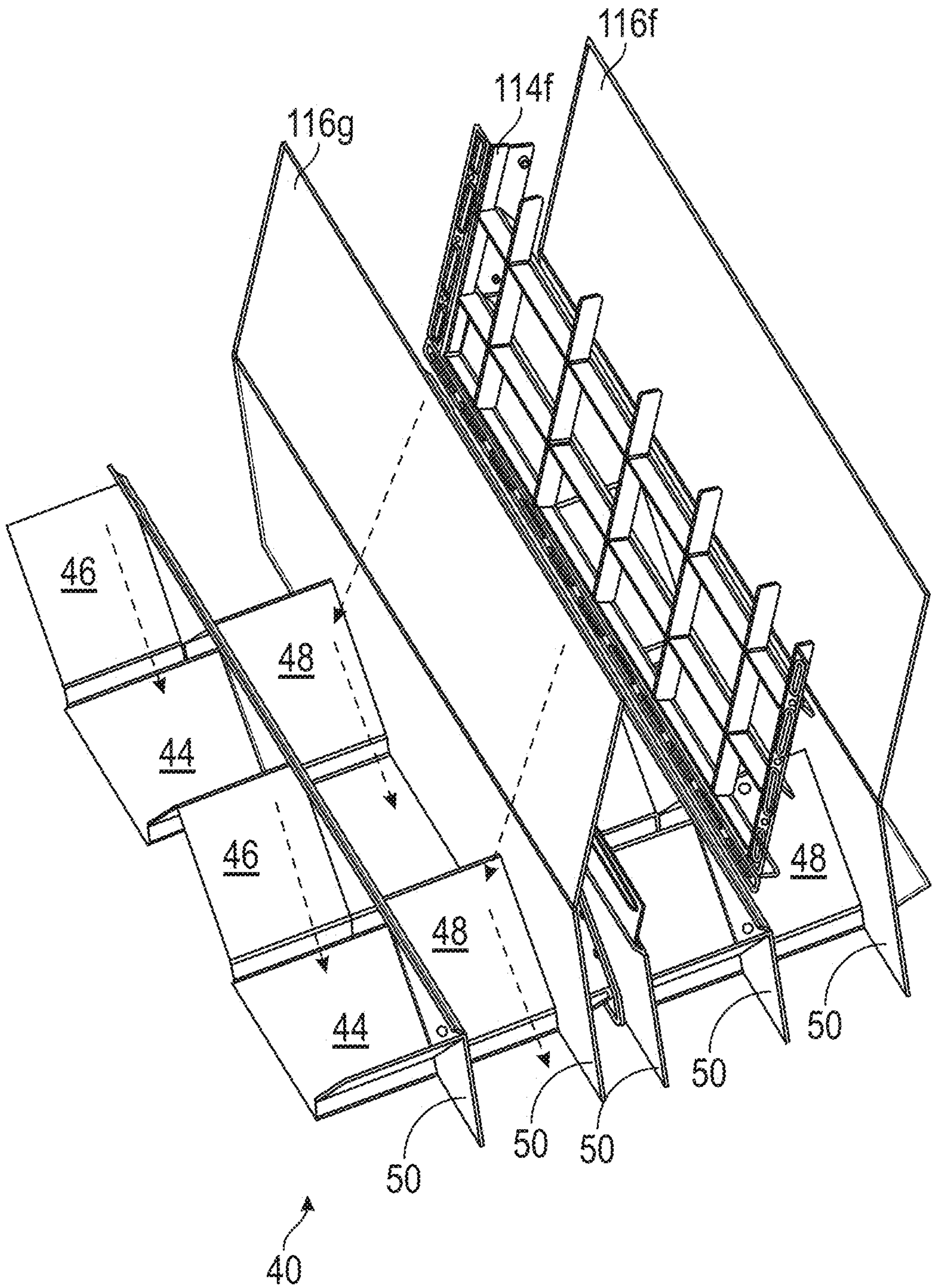
FIG. 1E shows another partial perspective view of internal baffling of the stacked screening apparatus of FIG. 1C, in an embodiment.

To deliver oversized materials to the rearward collection hopper 104*b*, oversized materials passing over the ends of each of the screen surfaces of each module 110*a-g* are funneled into one or more collection chutes 42. Each collection chute 42 has a solid bottom surface 44 that is slanted to deliver the collected oversized materials to the rearward collection hopper 104*b*. In contrast, the undersized materials pass directly into the forward collection hopper 104*a*. This is better illustrated in the partial views of FIGS. 1D and 1E, which show cross support frames 114*g* (removed from FIG. 1E) and 114*f* and solid bottom surfaces 116*g* and 116*f* of two of the modules 100*g* and 100*f* of the screening apparatus 100 of FIG. 1C. As shown the cross-support frames 114*g*, 114*f* (which would each support a screen surface) and the bottom surfaces 116*g* and 116*f* feed into the baffling assembly 40. Oversized materials passing over the ends of screens (not shown) attached to the cross-support frames 114*g* and 114*f*, as illustrated by short dash arrows, fall directly into the bottom surfaces 44 of the chutes 42 or are directed into the bottom surfaces 44 of the chutes by a set of slanted oversized material baffles 46. Undersized materials passing over the ends of the solid bottom surfaces 116*g* and 116*f*, as illustrated by short dash-long dash arrows, fall directly into the forward collection hopper (not shown) or are directed into the forward collection hopper by slanted tenting baffles 48 that cover the upper surfaces of the chutes 42. The set of slanted oversized material baffles 46 and the slanted tenting baffles 48 are separated by dividing walls 50. In the illustrated embodiment, each module 110 will include a set of oversized material baffles 46, one or more slanted tenting baffles 48 and two dividing walls 50. As a result of the baffling assembly 40, oversized materials are collected rearward material hopper 104*b* and undersized materials are collected in the forward material hopper 104*a*. The undersized materials exit the forward material hopper 104*a* through an under-sized material discharge port 108 while oversized materials exit the rearward material hopper 104*b* through an oversized material discharge port 106.

In the embodiment illustrated in FIG. 1B, where the screening apparatus 100 utilizes three stacked screening modules 110*a*, 110*b*, 110*c*, the apparatus provides three separate flow paths for screening material. That is, a first flow path is formed through the first screening module 110*a* for separating undersized materials from oversized materials, a second fluidly isolated flow path is formed through the second screening module 110*b* and a third fluidly isolated flow path is formed through the third screening module 110*c*. As illustrated, three stacked fluid flow paths are provided where each fluid flow path may separate oversized materials from undersized materials.

Figure 3A:
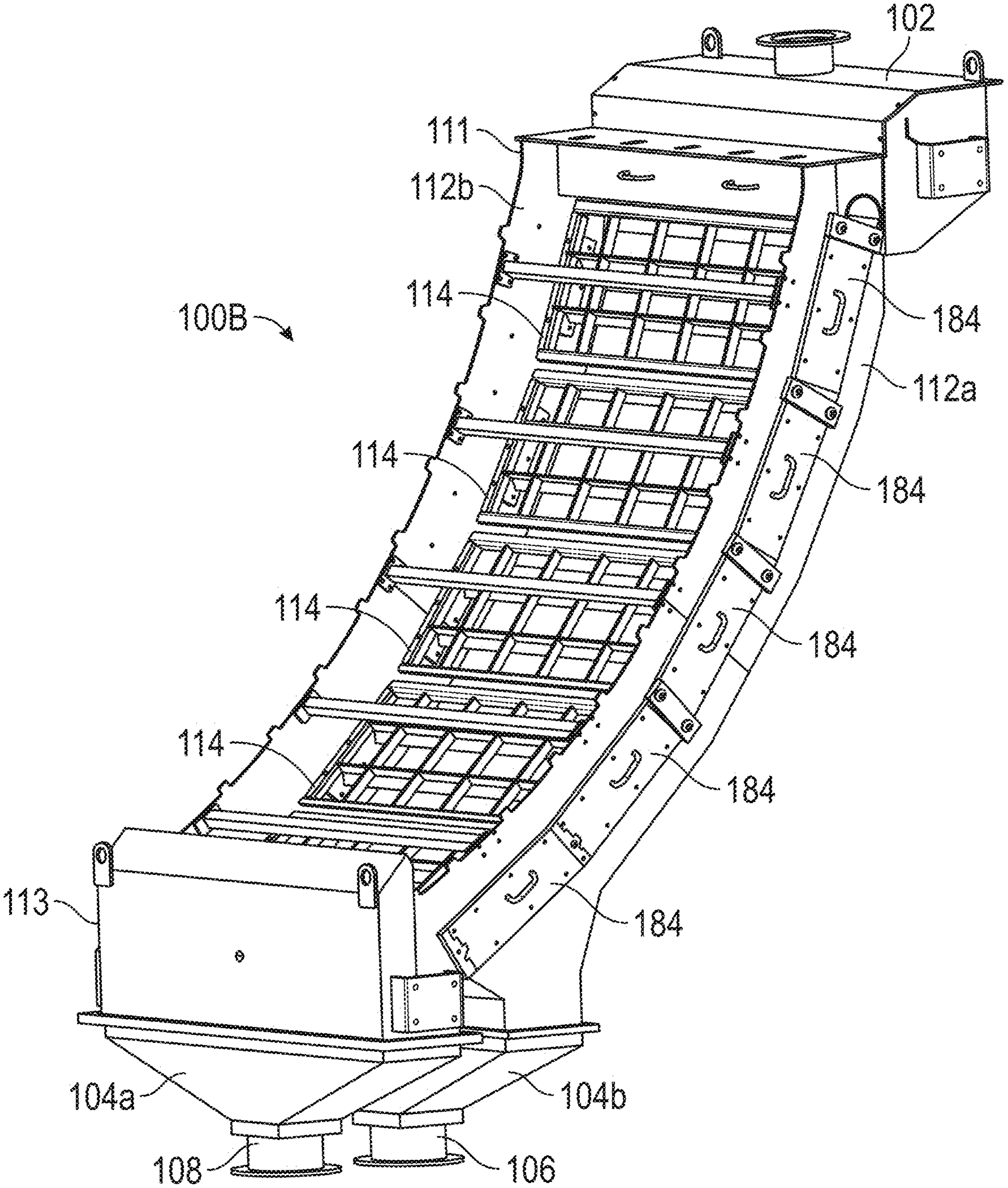
FIG. 3A shows a perspective view of a single screen surface static screening apparatus, in an embodiment.
Figure 3B:
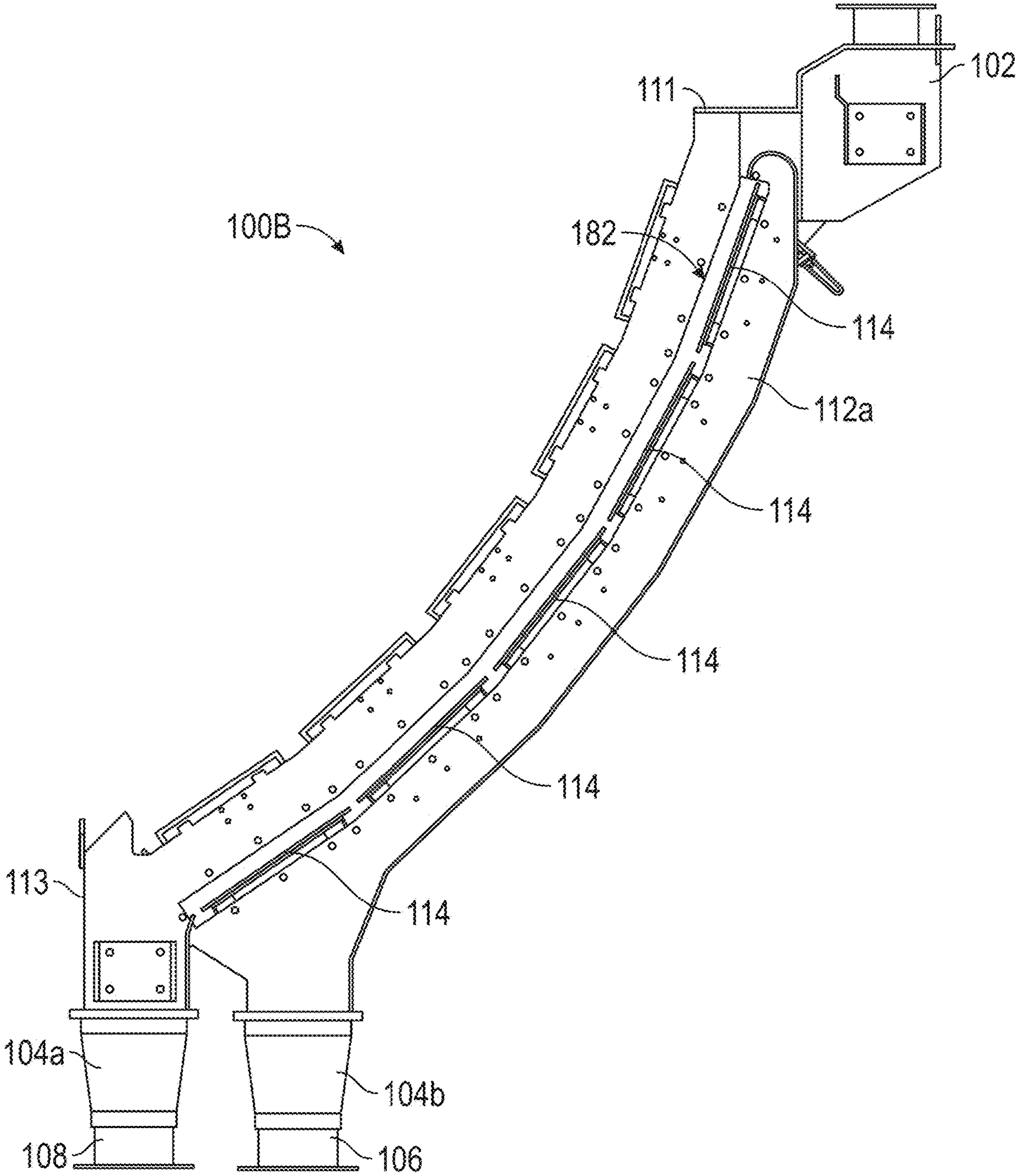
FIG. 3B shows a side view of the single screen surface static screening apparatus of FIG. 3A, in an embodiment.

FIGS. 3A and 3B illustrate perspective and side views, respectively, of an alternate embodiment of a static screening apparatus 100A. This alternate embodiment is similar to the screening apparatus 100 of FIGS. 1A and 1B and like components are labeled with like reference numbers. In this embodiment, the static screening apparatus 100A may be a stand-alone apparatus having a single screening surface. As shown, the screening apparatus 100A includes first and second spaced sidewalls 112*a*, 112*b*, cross-support frames 114 extending between inside surfaces of the spaced sidewalls 112. The cross-support frames collectively define a concave screening bed for supporting a correspondingly concave screening surface (not shown). In the illustrated embodiment, the static screening apparatus 100A is configured to collect oversized materials passing over the outlet end of a supported screen surface in oversized material hopper 104*b* and collect undersized materials passing over the outlet end of the solid bottom surface of the apparatus 100A in an undersized material hopper 104*a*. The undersized materials exit the undersized material hopper 104*a* through an under-sized material discharge port 108 while oversized materials exit the oversized material hopper 104*b* through an oversized material discharge port 106.

Figure 4A:
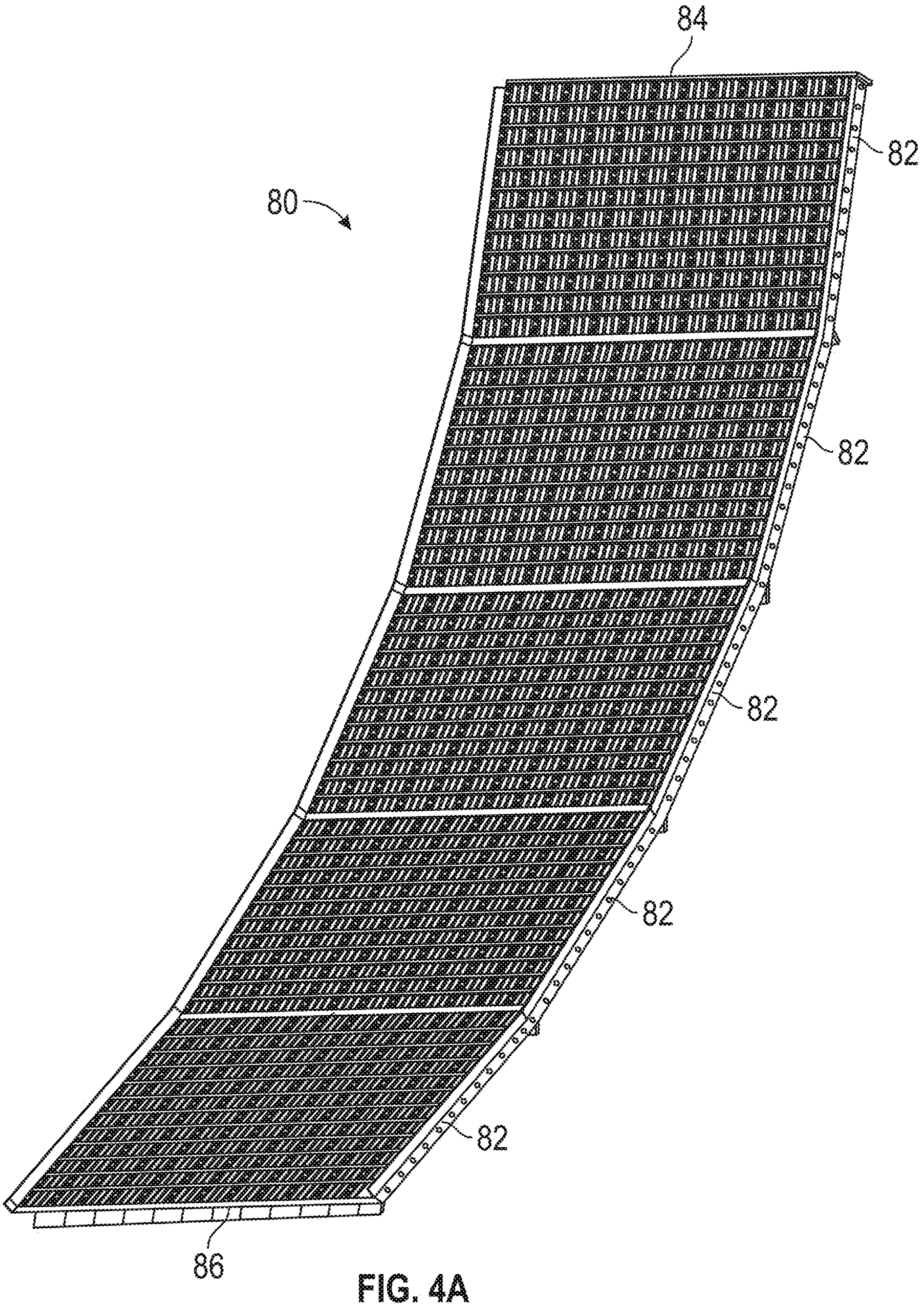
FIG. 4A shows a perspective view of a concave screening surface, in an embodiment.
Figure 4B:
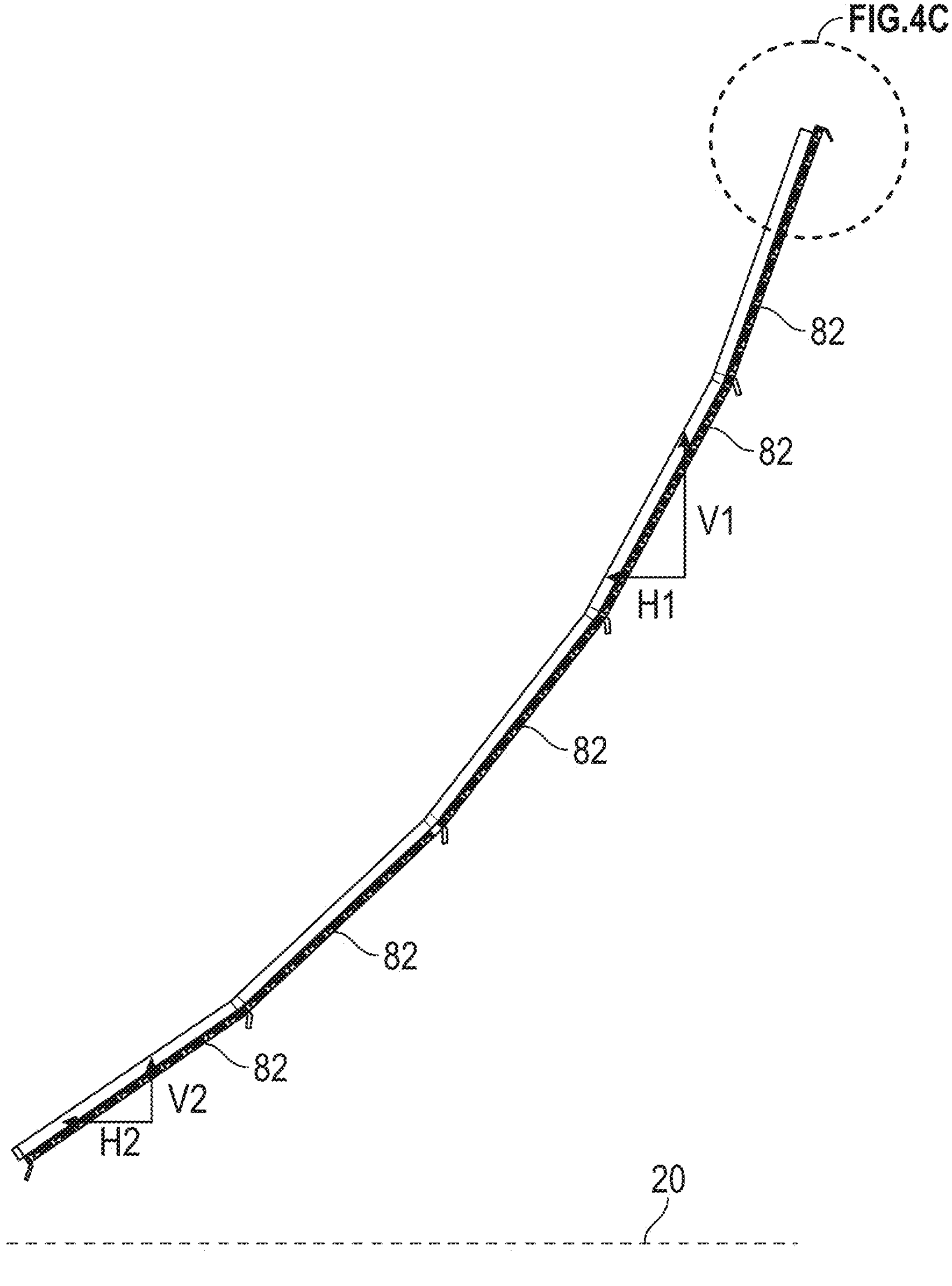
FIG. 4B shows a side view of a concave screening surface, in an embodiment.

FIGS. 4A and 4B illustrate an embodiment of the screen surface 80 that may be utilized with the screening apparatuses discussed above. In the illustrated embodiment, screen surface 80 is formed from five individual screening assemblies 82 (e.g., panels) that are disposed adjacent to one another when disposed within a screening module or screening apparatus. In the illustrated embodiment each screening assembly 82 is supported by one of the cross-support frames 114 noted above. In an embodiment, each individual screening assembly may be formed from a flat screening surface. In such an embodiment, the flat surfaces of multiple screening assemblies 82 collectively define a concave screening surface 80 between the inlet end 84 and the outlet end 86. In this regard, each screening assembly 82 may be disposed at an angle relative to one or two adjacent screening assemblies 82. In other embodiments, the screen surface may be made of a single screening assembly and/or an arcuate screening assembly.

When inserted in a static screening apparatus that primarily operates under the force of gravity, the entire length of the screen surface 80 may be disposed at a nonzero angle relative to a horizontal reference axis 20. That is, each location along the length of the screen surface 80 between the inlet end 84 in the outlet end 86, may include a non-zero vertical component 'V' and horizontal component 'H'. In an embodiment, portions of the screen surface 80 closer to the inlet end 84 of the screen surface 80 may have a vertical component V1 that is larger in a vertical component V2 of the screen surface 80 closer to the outlet end 86 of the screen surface. That is, an upper portion of the concave screen surface may be steeper than lower portions of the concave screen surface. In an embodiment, the upper portion of the concave screen surface may be perpendicular to the lower portion of the concave screen surface. That is, the upper portion may be vertical (e.g., zero horizontal component) while the lower portion may be horizontal (e.g., zero vertical component). In such an arrangement, each portion or panel of the concave screen surface may be disposed at an angle between 0° and 90° relative to the horizontal reference axis 20. In another embodiment, each panel may be disposed is disposed in a range of between about at an angle between 15° and 75° relative to the horizontal reference axis 20. In another embodiment, each panel may be disposed is disposed in a range of between about at an angle between 45° and 60° relative to the horizontal reference axis 20.

Figure 5A:
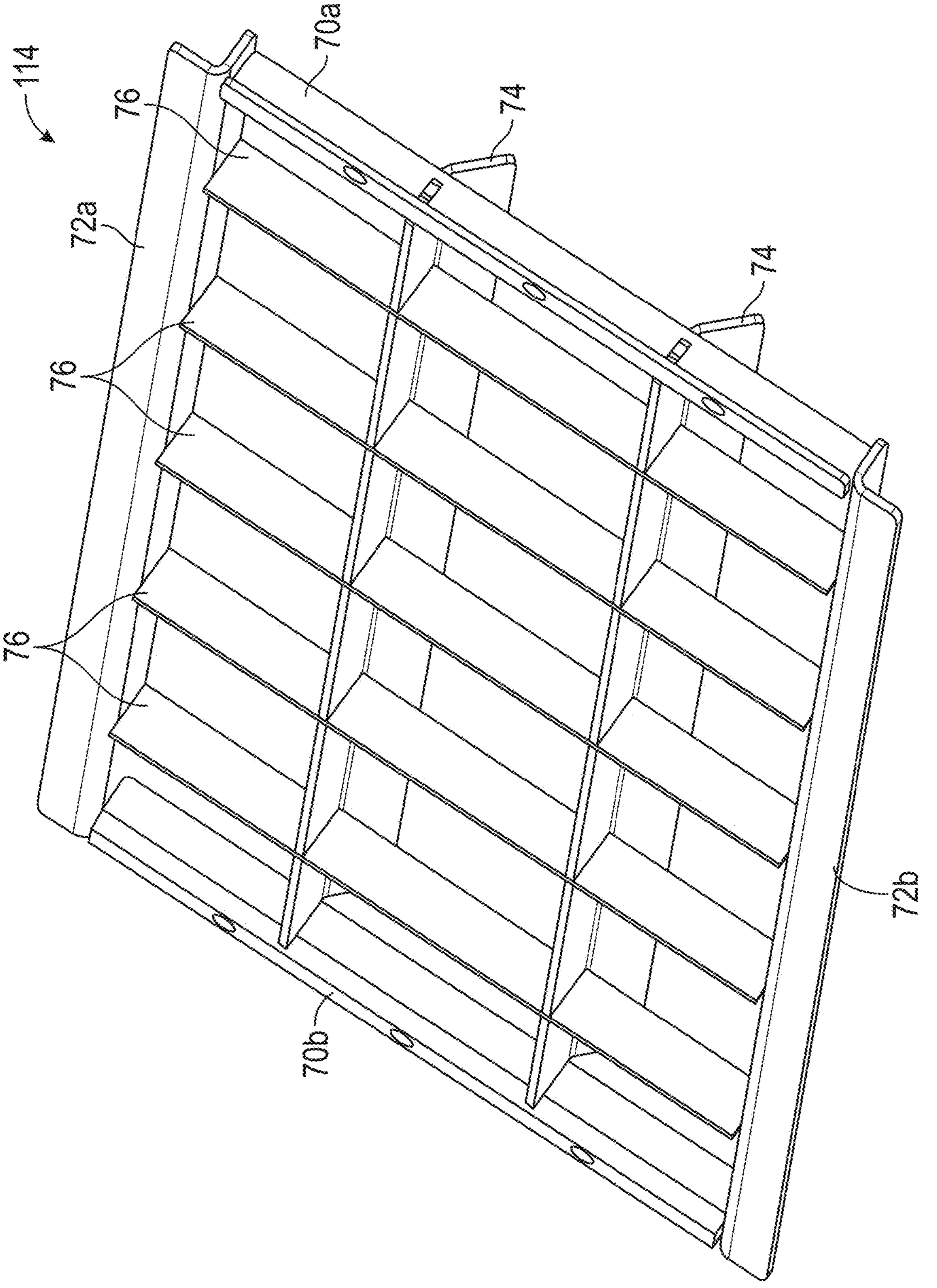
FIG. 5A shows a perspective view of a cross-support frame, in an embodiment.

FIG. 5 illustrates one nonlimiting embodiment of the cross-support frame 114 which may be utilized in the disclosed screening apparatuses and screening modules. As shown, the cross-support frame 114 includes first and second side rails 70*a*, 70*b* configured for secured attachment (e.g., bolting, welding, etc.) to the inside surfaces of the sidewalls 112 of a screening apparatus or screening module. First and second end rails 72*a*, 72*b* extend between and connect to first and second ends (e.g., upper and lower ends) of each of the first and second side rails 70*a*, 70*b*. In addition, one or more crosswise stringers 74 extend between the first and second side rails 70*a*, 70*b* between their upper and lower ends. The end rails 72*a*, 72*b* and the crosswise stringers 74 each individually define a single cross-support for supporting an overlying screen surface and/or screening assembly. In an embodiment, one or more lengthwise stringers 76 may extend between the first and second ends rails 72*a*, 72*b* along their length. The side rails 70*a*, 70*b*, end rails 72*a*, 72*b*, crosswise stringers 74 and lengthwise stringers 76 may collectively define an open support grid which may be utilized to support an underside of a screening surface or screening assembly disposed within a screening apparatus/module. In the illustrated embodiment, upper surfaces of each of the members of the cross-support frame 114 are generally level defining a generally flat support plane. However, in other embodiments various members may be curved to accommodate curved screen surface. Of further note, the cross-support frame 114 is illustrated as forming the generally rectangular grid structure. Other configurations are possible and considered within the scope of the present disclosure. In any embodiment, the cross-support frame 114 may provide a support structure for supporting the underside of a screen surface or screening assembly that is not self-supporting.

As discussed above, one or more screening modules 110 may be stacked to form a combined screening apparatus 100. In such an arrangement, difficulties arise accessing individual screening surfaces (e.g., screening assemblies 82; see FIG. 4A), which wear over time and require replacement. That is, access through the top of the screening apparatus 100 is not available for one or more underling screening modules 110 in a stacked screening apparatus 100. The distance between the stacked modules 110 prevents ready access to the screening bed between the sidewalls 112 of an underlying module. To facilitate the removal and replacement of individual screen assemblies 82, the screening modules 110 may include a screen access opening(s) or slot(s) 182 that extend through at least one of the sidewalls (e.g., sidewall 112*a*) of the screening apparatus 100 to provide access to the interior (e.g., screening bed) of the screening apparatus 100 between the sidewalls 112. See, e.g., FIG. 3B. As shown, the access slot 182 extends through one sidewall 112*a* of the screening apparatus 100A. In an embodiment, the access slot 182 extends from near an upper end 111 of the sidewall 112*a* to near a lower end 113 of the sidewall 112*a*. The access slot(s) 182 provides an opening between an upper and lower edge of the sidewall 112*a* that allows a user to access the cross-support frames 114. That is, a technician may access the screening bed defined by the cross-support frames to remove and/or insert a screen assembly 82. See FIG. 2A. The access slot 182 may be selectively accessed via one or more access doors 184, which are configured to cover all or a portion of the access slot(s) 182. See, e.g., FIGS. 2A and 3A. In an embodiment, the screening apparatus may include a separate access door 184 for each separate screening surface or screening assembly disposed between the sidewalls of the screening apparatus or screening module. Alternatively, a single access door (e.g., plate) may provide access to multiple screen surfaces and/or screening assemblies. In any embodiment, the access door(s) 184 may be attached to the sidewall 112*a* utilizing various clamps, magnetic attachments and/or hinges. In an embodiment, the doors are removable. However, this is not a requirement. Once an access door is opened or removed, a technician may remove a worn screen assembly (not shown) from between the first and second wall members 112*a*, 112*b* and from their supporting cross supports 114. The technician may then reinsert a replacement screen assembly through the access slot 182 and replace the access door 184.

Figure 4C:
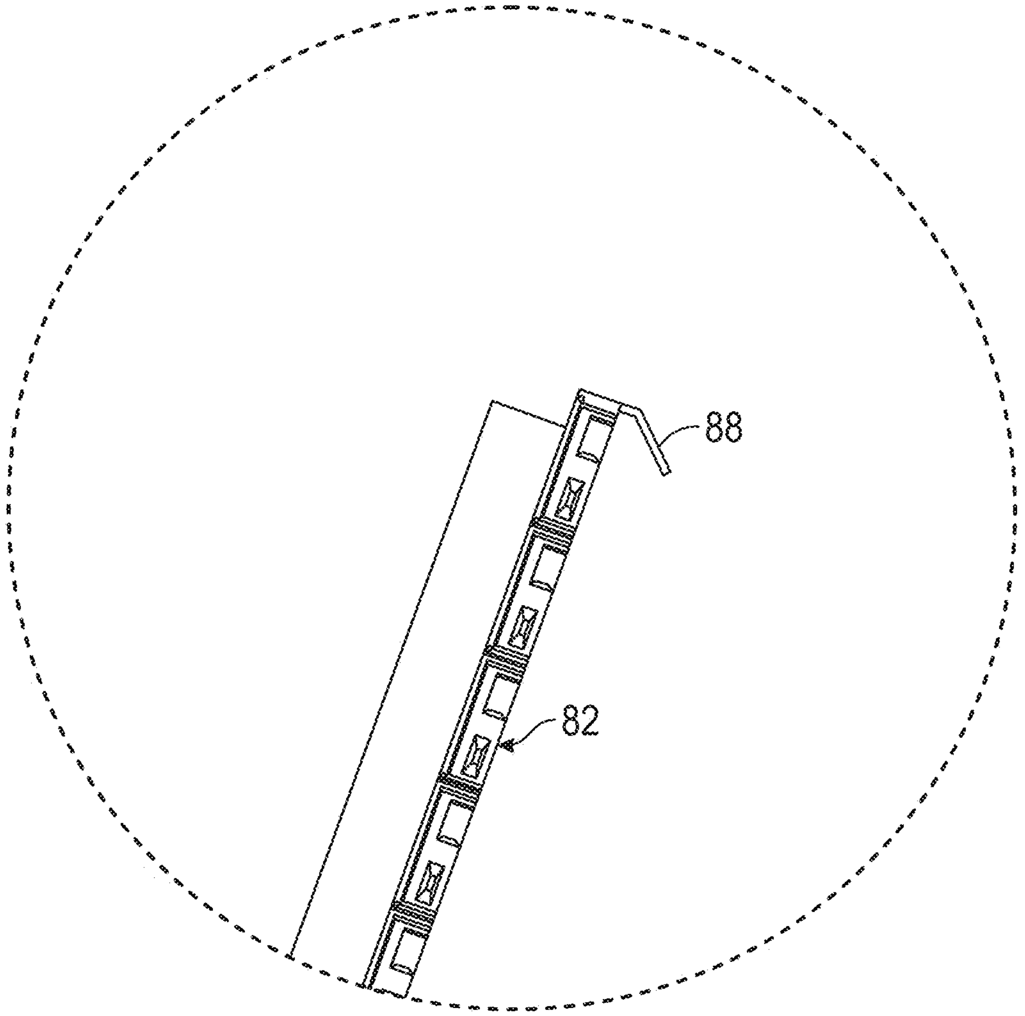
FIG. 4C shows a close-up of a portion of the screening surface of FIG. 4B, in an embodiment.
Figure 5B:
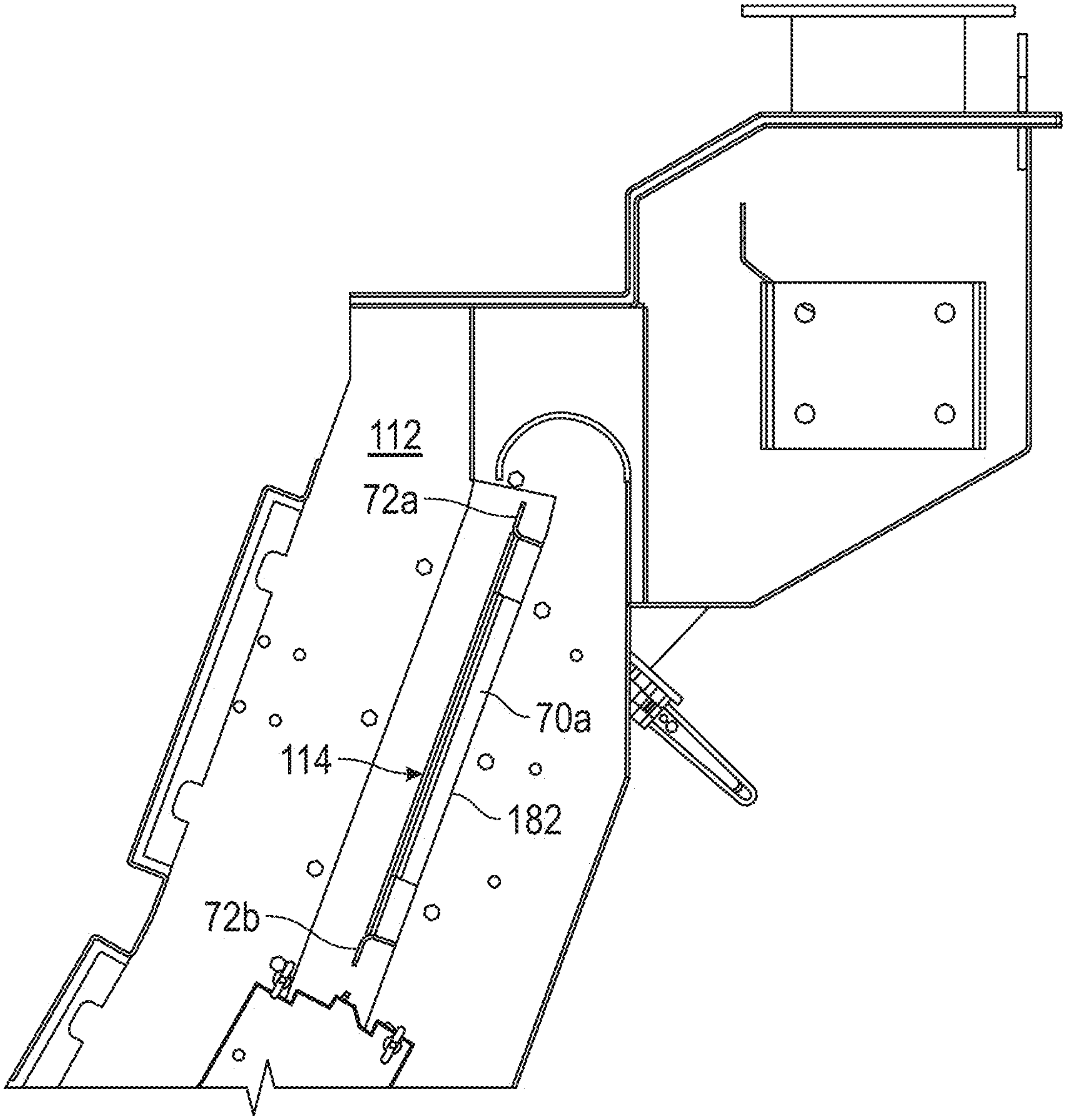
FIG. 5B shows a side view of a cross-support frame mounted in a static screening apparatus, in an embodiment.
Figure 5C:
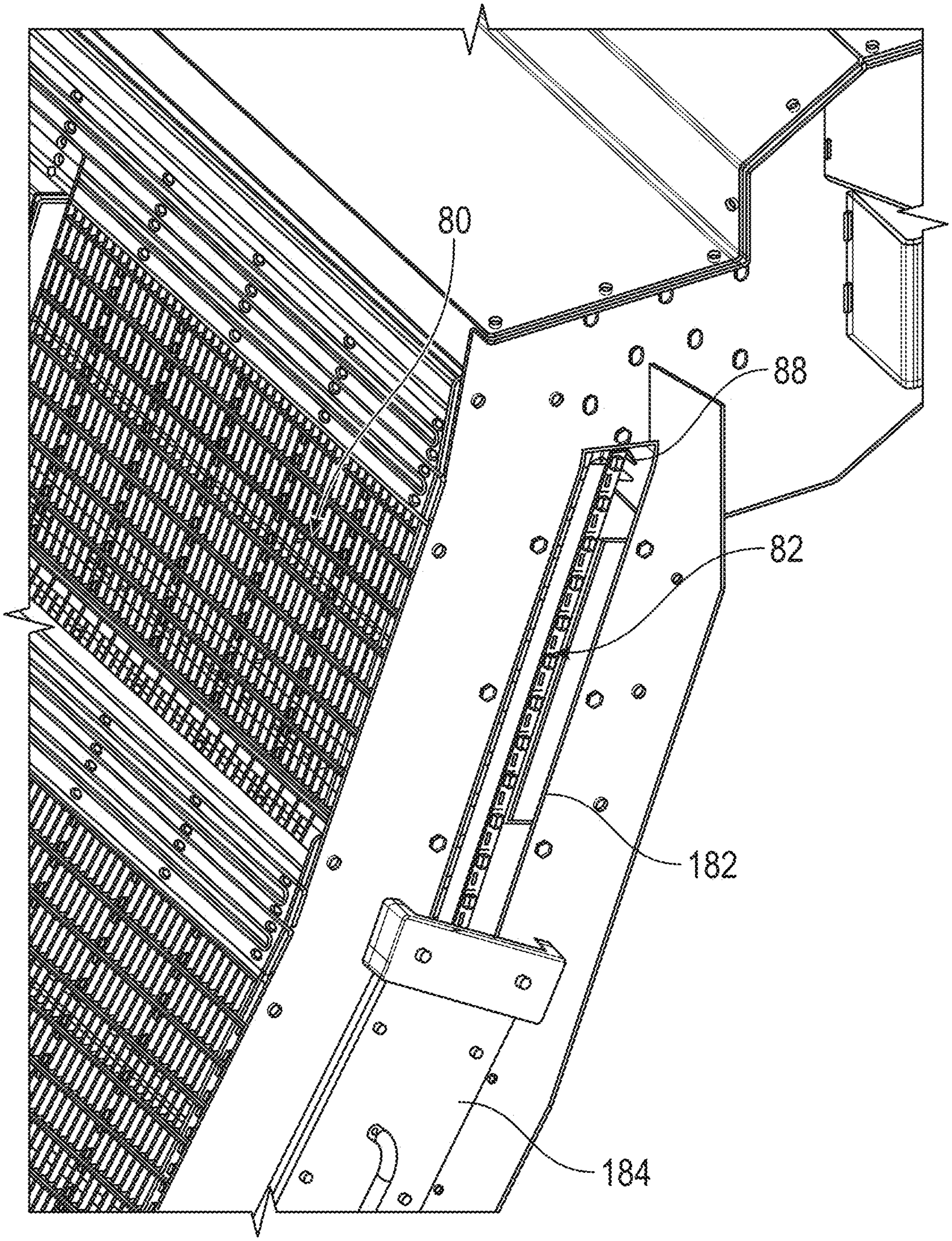
FIG. 5C shoes a perspective view of a cross-support frame mounted in a static screening apparatus supporting a screening assembly, in an embodiment.

Referring to FIGS. 5A, 5B, 5C and 4C, engagement between the cross-support frame 114 and a screening assembly 82 is described. In an embodiment, the end rails 72*a*, 72*b* of the cross-support frame 114 provide a sliding guide element for guided insertion of individual screening assembly 82 into a screening apparatus as well as a means for securing the screening assembly 82 in place. FIG. 5B illustrates a cross-support frame 114 as shown installed on the screening apparatus as viewed through the access slot 182 in a sidewall 112 of the screening apparatus 100. As shown, the upper and lower end rails 72*a* and 72*b* of the cross-support frame 114 are formed of angle brackets having a free end that forms a lip or under ledge across the interior of the screening apparatus or screening module between the sidewalls. In this embodiment, the upper and lower end rails 72*a*, 72*b* form both a cross-support and a guide element for engaging a screening assembly. In other embodiments, guide elements may be separate elements from the cross-supports. As shown in FIG. 4C, each end of the screening assembly 82 (only one shown) includes a tab 88 (e.g., concave tab) disposed across at least a portion of a width of the screening assembly 82. When a screening assembly is inserted into a screening apparatus or screening module (e.g., through a screen access opening for disposition between the first and second sidewalls), the tabs 88 on each end of the screening assembly 82 engage under the free ends or lips of the upper and lower end rails 72*a*, 72*b*. This properly aligns the screening assembly 82 with the screening apparatus and permits the screening assembly 82 to be slid into place. At such time, a technician may secure a door 184 to a sidewall 112 of screening apparatus which maintains the screening assembly 82 laterally between the sidewalls of the screening apparatus. See, e.g., FIG. 5C. Further, the engagement between the end rails 72*a*, 72*b* by the tabs 88 securely holds the screen assembly 82 relative to the screening bed of the screening apparatus. In an embodiment, such tabs 88 may be attached to a support structure or frame underlying a screening surface of the screening assembly 82. While discussed as using a tab to engage an angle bracket, it will be appreciated that other forms of slidable engagement (e.g., mating engagement) between one or more of the cross-supports and the screening assembly may be utilized. By way of example, a cross-support may include U-shaped channels that receive upper and lower ends of a screening assembly. In such embodiments, the screening assembly may have one or more engagement structure(s) or engagement element(s) (e.g., tabs, hooks, angle brackets, opens, rings etc.) that slidably engage one or more mating guide surface(s) or guide element(s) (e.g., lip, channel, rod etc.) associated with a cross-member in the screening bed of the screening apparatus.

Figure 6:
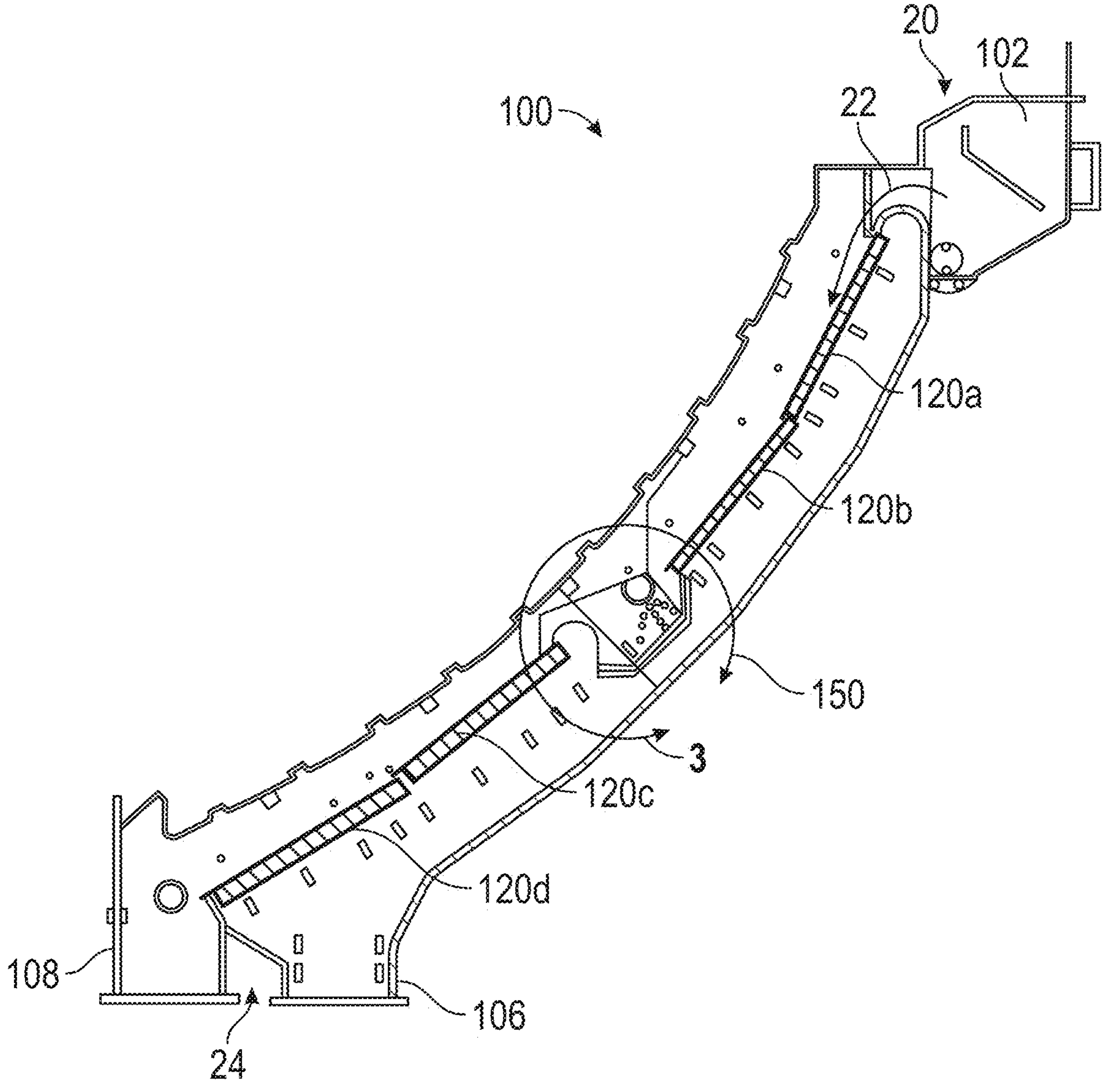
FIG. 6 shows a perspective view of another embodiment of a static screening apparatus, in an embodiment.

FIG. 6 illustrates an alternative embodiment of a screening apparatus 100C. This alternate embodiment is similar to the screening apparatus of FIGS. 1A and 3A and some like components are labeled with like reference numbers. The embodiment of FIG. 6 incorporates a slurry rewetting trough disposed along the length of the screening surface. Such a rewetting trough may be incorporated into any embodiment of the disclosed screening apparatuses or screening modules. FIG. 6, illustrates a side view of the screening apparatus 100C with the facing sidewall removed to show internal components of the apparatus 100C. The screening apparatus 100C includes first and second wall members 112*b* (only one shown), cross-supports (not shown) extending between inside surfaces of the wall members, a plurality of removable screen assemblies 120*a-d* disposed between the wall members 112 and supported by the cross-support surfaces, an inlet feeder 102 and an undersized discharge hopper and port 106 and an oversized discharge hopper and port 108.

Slurry is initially fed into the slurry inlet feeder 102. Within the feeder 102, the slurry may be agitated and/or mixed with additional liquid. Slurry in the inlet hopper spills over a weir at an inlet end 20 of the apparatus onto a top surface of a first screen assembly 120*a*. The material travels in flow direction 22 down the surface of the first screen assembly 120*a*. The slurry passes from the first screen assembly 120*a* to a second subsequent screen assembly 120*b*. After passing over the second screen assembly 120*b*, the partially dewatered slurry passes into an intermediate slurry box/re-feeder assembly 150 where it is fully re-wet and re-slurried. The re-wet slurry passes out of the slurry box/re-feeder assembly 150 onto a third screening assembly 120*c* and progresses to a fourth screening assembly 120*d*. Materials passing through screen surfaces of the screening assemblies 120*a*-120*d* (hereafter 120 unless specifically referenced) exit the screening apparatus through the undersized discharge hopper and port 106 at an outlet end 24 of the apparatus 100 while materials passing over the end of the fourth screening assembly 120*d* pass through a separate fluidly isolated oversized discharge hopper and port 108 at the outlet end of the apparatus 100.

Figure 7:
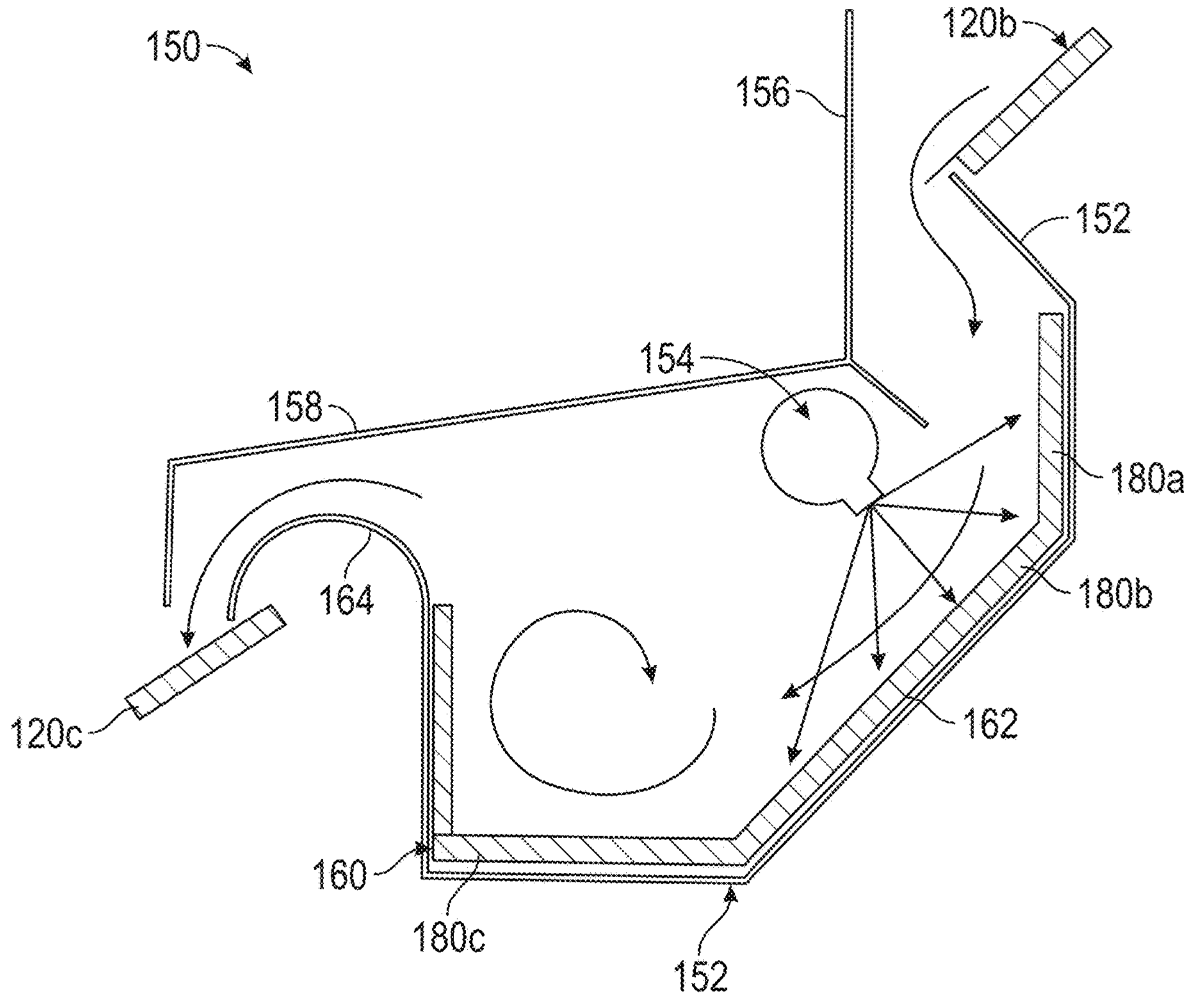
FIG. 7 shows an intermediate slurry trough assembly, in an embodiment.

FIG. 7 illustrates one embodiment of intermediate slurry box/re-feeder assembly 150. In the illustrated embodiment, the slurry box/re-feeder assembly 150 includes a concave body or trough 152 and a spray bar 154. In operation the slurry box/re-feeder assembly 150 receives slurry from an upper surface of an upstream screen assembly 120 (e.g., 120*b*), which overlaps an upper edge of the trough 152. As the slurry has previously passed over one or more screening assemblies, the slurry is partially dewatered when it arrives at the slurry box/re-feeder assembly 150. The partially dewatered slurry moves/falls into an interior of the trough 152. In various embodiments, the slurry box/re-feeder assembly 150 may include a deflector panel 156 and/or cover 158 to direct and/or contain the slurry. As the partially dewatered slurry is received within the slurry box/re-feeder assembly 150, it may pass beneath the spray bar 154, which may spray water into the previously partially dewatered slurry. The slurry and added water settle into a lower portion or basin 160 of the trough 152. The movement of the incoming slurry, which moves under the spray bar 154 and down and angled wall 162 of the trough, results in the slurry within the basin 160 mixing/churning with the added water. This allows the slurry to be fully re-wet (e.g., re-slurried). As additional slurry enters the basin 160, slurry at the top of the basin passes over an exit weir 164 and is deposited onto the top surface of a downstream screen assembly 120 (e.g., 120*c*).

In one embodiment, the trough 152 is a solid surface (e.g., sheet metal). In a further embodiment, the trough 152 may be a porous or perforated surface that allows the interior of the trough 152 to be lined with screen assemblies 180*a-c*. In such an arrangement, a screening apparatus 100 may continue screening materials as they pass through the intermediate slurry box/re-feeder assembly 150. It will be appreciated that while the interior surfaces of the trough 152 may be porous, the spray bar 154 may provide enough fluid flow to re-wet the incoming slurry. Along these lines, previously partially dewatered slurry may be re-slurried while material screening continues through the intermediate slurry box/re-feeder assembly 150.

Figure 8A:
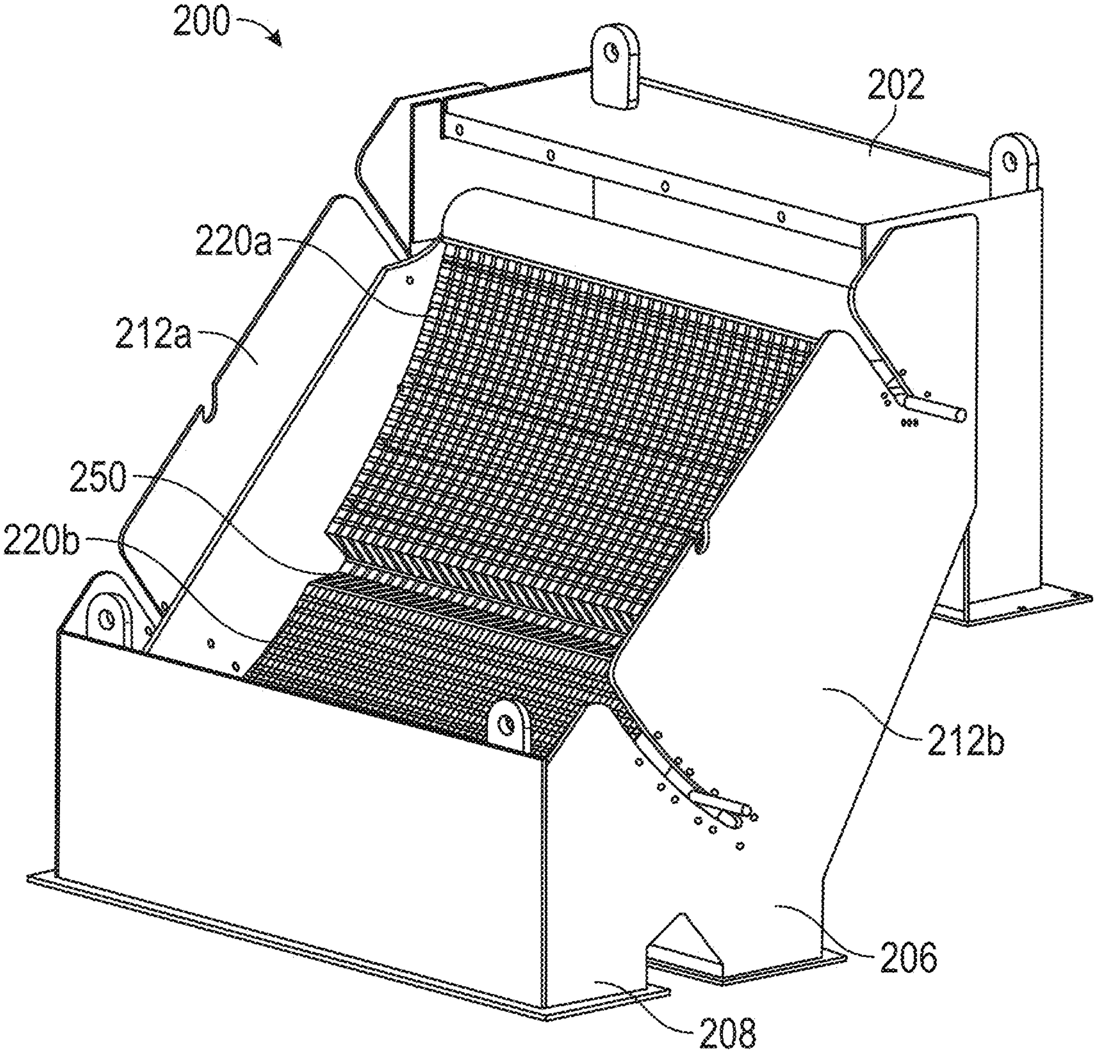
FIG. 8A shows a perspective view of a fully assembled static screening apparatus, in an embodiment.
Figure 8B:
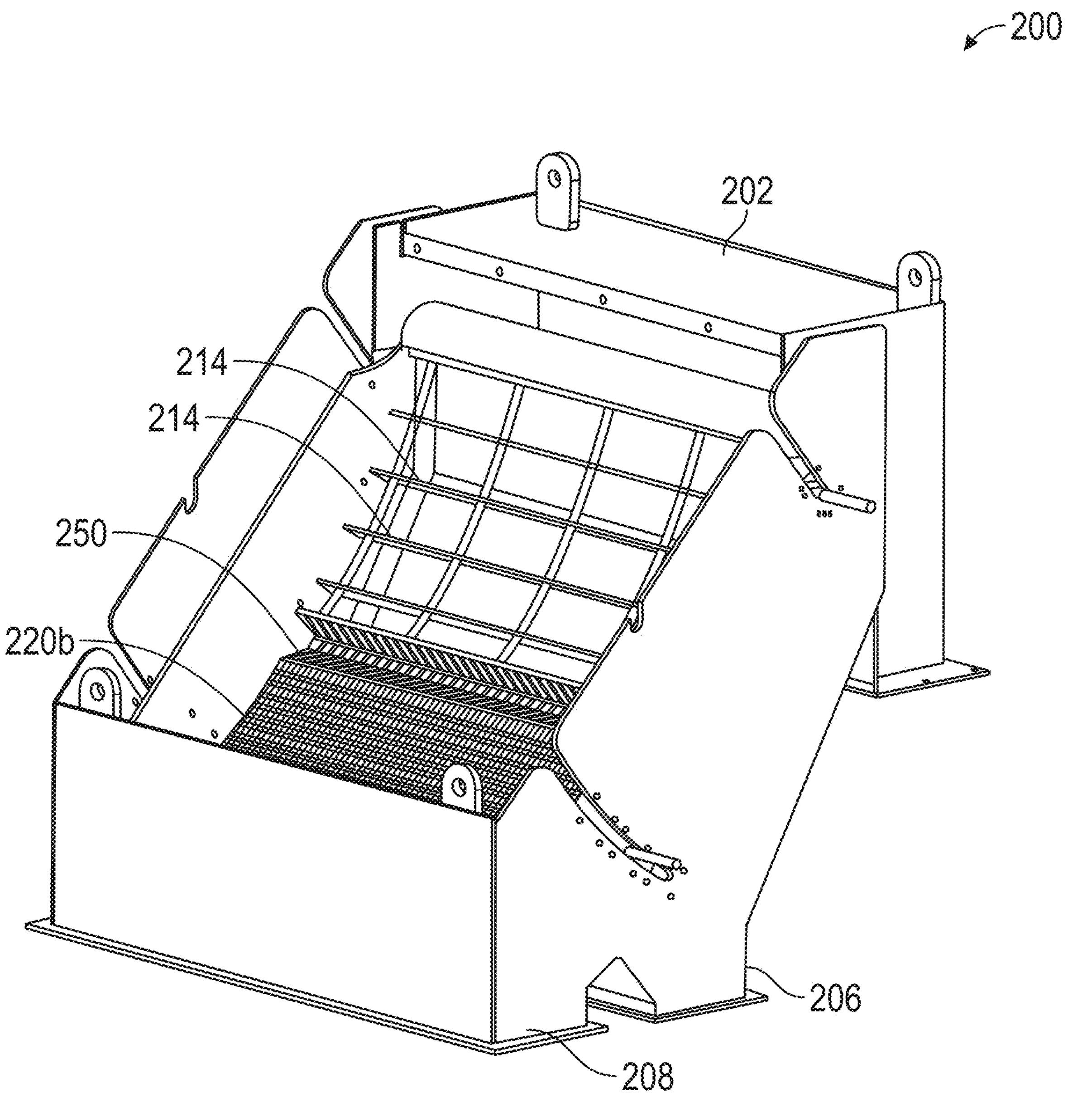
FIG. 8B shows the screening apparatus of FIG. 8A with one screening panel removed in an embodiment.
Figure 8C:
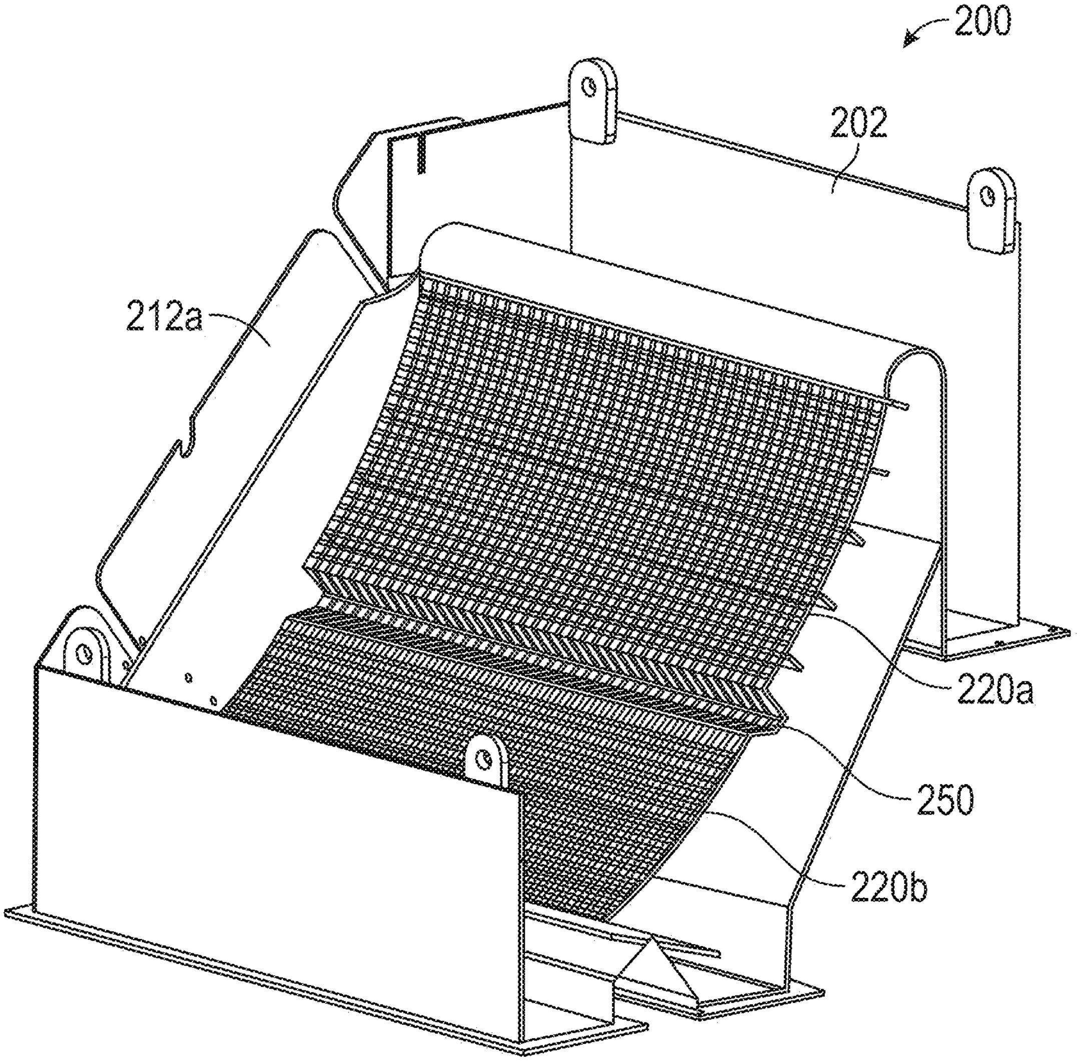
FIG. 8C shows the screening apparatus of FIG. 8A with one sidewall removed in an embodiment.

FIGS. 8A, 8B and 8C variously illustrate another embodiment of a slurry screening apparatus 200. Specifically, FIG. 8A illustrates a fully assembled perspective view of the apparatus 200, FIG. 8B illustrates the apparatus 200 with one screening panel removed, and FIG. 8C illustrates the apparatus 200 with one sidewall removed to illustrate the interior of the apparatus. The screening apparatus 200 includes first and second wall members 212*a*, 212*b* (hereafter 112 unless specifically referenced), cross-support surfaces 214 (e.g., bulkheads or stringers) extending between inside surfaces of the wall members 212, first and second removable screen assemblies 220*a* and 220*b* disposed between the wall members 212 and supported by the cross-support surfaces 214, an intermediate slurry box/re-feeder screen 250 disposed between the first and second screen assemblies 220*a*, 220*b*, an inlet hopper 202, an undersized discharge hopper/port 206 and an oversized discharge hopper/port 208.

Figure 8D:
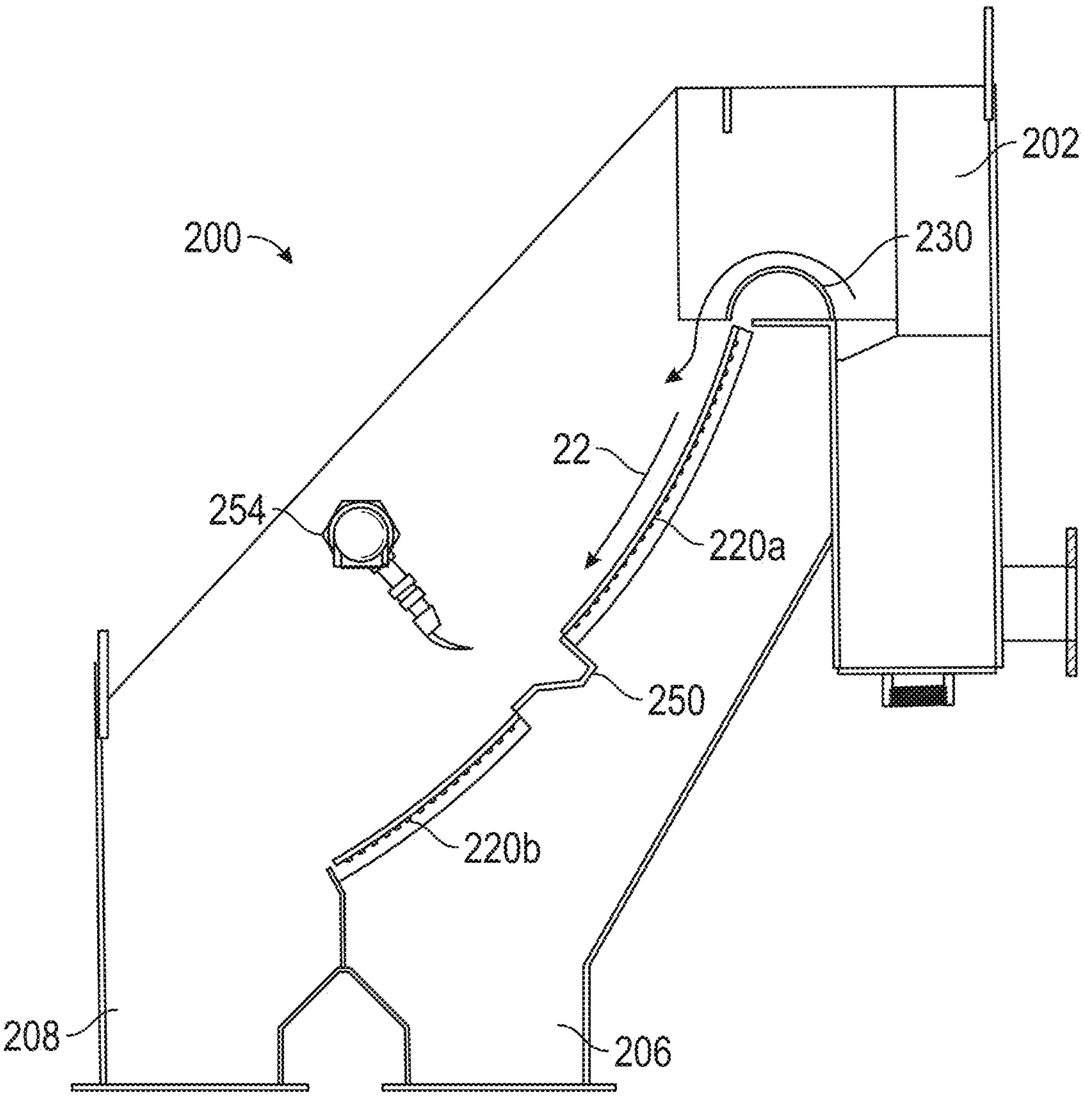
FIG. 8D shows a cross-sectional view of the screening apparatus of FIG. 8A.

As illustrated in the cross-sectional view of FIG. 8D, slurry is initially fed into the slurry inlet hopper 202. Slurry in the inlet hopper spills over a weir 230 at an inlet end of the apparatus 200 onto a top surface of the first screen assembly 220*a*. The material travels in flow direction 22 down the surface of the first screen assembly 220*a*. The slurry passes from the first screen assembly 220*a* into the intermediate slurry box/re-feeder screen 250 where a spray bar 254 re-wets the received slurry. The re-wet slurry passes out of the slurry box/re-feeder screen 250 onto the second screen assembly 220*b*. Materials passing through screen surfaces of the first and second screen assemblies 220*a*, 220*b* and the slurry box/re-feeder screen 250 exit the screening apparatus through the under-sized discharge hopper/port 206 at an outlet end of the apparatus 200 while materials passing over the end of the top surface of the second screen assembly 220*b* pass through a separate fluidly isolated oversized discharge hopper and port 208 at the outlet end of the apparatus 200. Like the apparatus discussed in relation to FIG. 3, the partially dewatered slurry in the intermediate slurry box/re-feeder screen 250 may be rewet within the concave surface of the trough-shaped screen by the spray bar 254. In an embodiment, the partially dewatered slurry is rewet the extent that it is re-slurried.

Figure 9A:
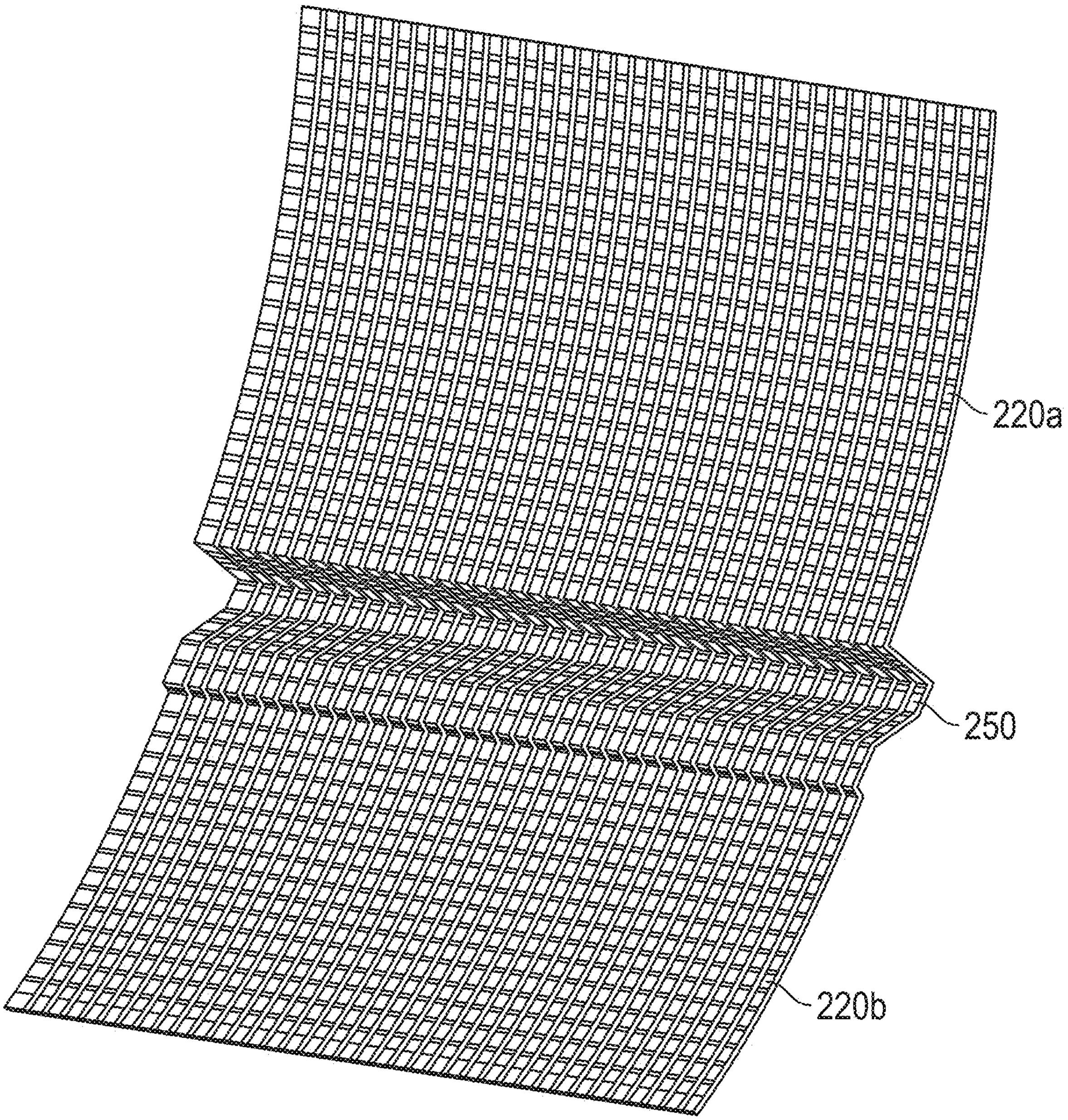
FIGS. 9A and 9B show assembled and exploded perspective views of the screen assemblies used with the screening apparatus of FIG. 8A, in an embodiment.
Figure 9B:
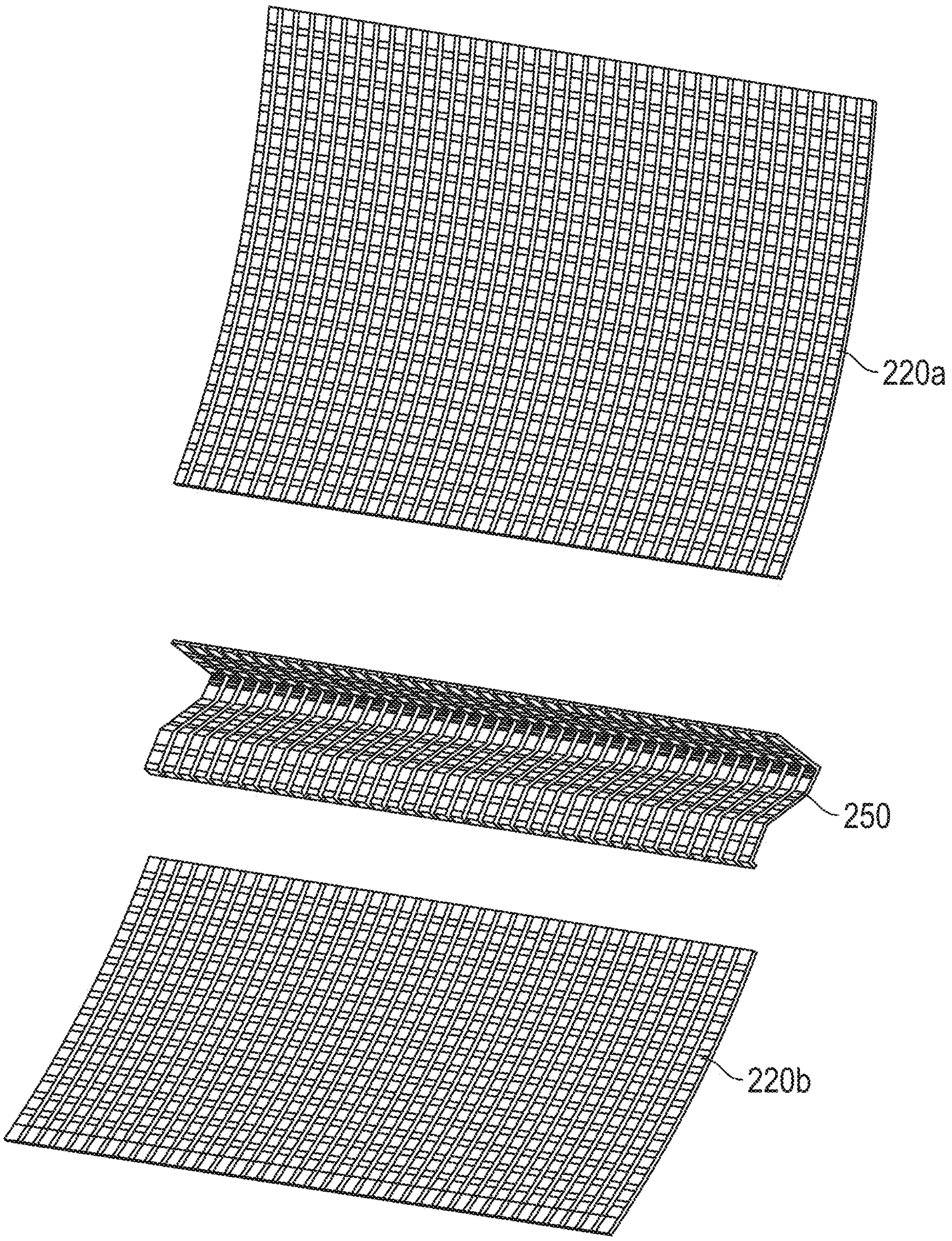

FIGS. 9A and 9B illustrate assembled and exploded perspective views of the screen assemblies 220*a*, 220*b* and the slurry box/re-feeder screen 250, in an embodiment. As shown, each of the screen assemblies and/or screen trough may be individually replaceable through, for instance, a side surface of the apparatus. This allows for spot changing worn or damaged screen assemblies rather than swapping out all screen assemblies. Further, each screen assembly and the slurry box/re-feeder screen may include seals on their lateral edges to seal against the walls of the apparatus to provide a new seal each time a screen assembly 120, 220 or trough 250 is replaced.

Figure 9C:
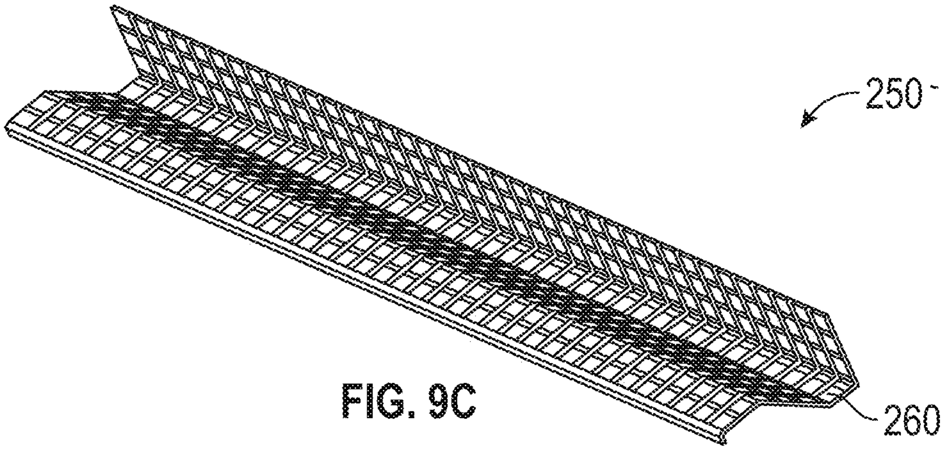
FIG. 9C shows a screening trough, in an embodiment.

FIG. 9C illustrates one embodiment of the intermediate slurry box/re-feeder screen 250. The slurry box/re-feeder screen 250 incudes a concave upper surface that forms a basin 260 into which partially dewatered slurry from an upstream screening assembly is received. Additional liquid (e.g., water) may be sprayed into the basin to re-wet the partially dewatered slurry. Further, the continual receipt of additional slurry from the upstream screening assembly may displace/churn the slurry within the basin allowing the additional liquid to fully mix with the slurry prior to being fed to a subsequent screen surface.

As noted above, static screening apparatuses such as the apparatus and modules described above tend to be less efficient than vibratory screening machines that vibrate screening surfaces in conjunction with movement of material over a screening surface(s). Aspects of the present disclosure are based in part on the realization that the efficiency and capacity of such static screening apparatuses may be significantly increased through the use of synthetic screening surfaces and, in particular, thermoplastic screening surfaces in comparison to conventional screening surfaces (e.g., wire and thermosetting materials). To improve the efficiencies of the static screening apparatuses disclosed above, those apparatuses may additionally incorporate a thermoplastic screening surface.

Of importance to screening performance of static screen apparatuses are the size of the openings in the screening surface, structural stability and durability of the screening surface, structural stability of the entire unit, chemical properties of the components of the unit and ability of the unit to perform in various temperatures and environments. Conventionally, wedge wire screens have been used in static screen applications. Benefits of wedge wire screens include that such screens are self-supporting and does not require tensioning or compression. Further, such wedge wire screens are more durable that wire mesh screens and polyurethane screens. Downsides of wire wedge screens is that to achieve higher strength and self-support bigger metal wires are used resulting in lower open area as well as increased blinging. That is, a new metal screen may initially have a relatively large open screening area but over time, as the screen is exposed to particles, screening openings plug (i.e., blind) and the open screening area, and effectiveness of the screen itself, is reduced relatively quickly.

Embodiments of thermoplastic screen assemblies disclosed herein may be utilized with the screening apparatuses discussed above. These thermoplastic screen assemblies are configured to have relatively large open screening areas while having structurally stable small screening openings for fine vibratory screening applications. In an embodiment, the screening openings are very small (e.g., as small as approximately 43 microns) and the screen elements are large enough (e.g., one inch by one inch, one inch by two inches, two inches by three inches, etc.) to make it practical to assemble a complete screen assembly screening surface (e.g., two feet by three feet, three feet by four feet, etc.). Fabricating small screening openings for fine screening applications requires injection molding very small structural members that actually form the screening openings. These structural members are injection molded to be formed integrally with the screen element structure. Importantly, the structural members are small enough (e.g., in certain applications they may be on the order of approximately 43 microns in screening surface width) to provide an effective overall open screening area and form part of the entire screen element structure that is large enough (e.g., two inches by three inches) to make it practical to assemble a relatively large complete screening surface (e.g., two feet by three feet) therefrom, screen assemblies that are configured to have relatively large open screening areas while having structurally stable small screening openings for fine screening applications. In embodiments, the screening openings are very small (e.g., as small as approximately 43 microns) and the screen elements are large enough (e.g., one inch by one inch, one inch by two inches, two inches by three inches, etc.) to make it practical to assemble a complete screen assembly screening surface (e.g., two feet by three feet, three feet by four feet, etc.). Fabricating small screening openings for fine screening applications requires injection molding very small structural members that actually form the screening openings. Further, thermoplastic screen assemblies have increased open area and are very resistant to blinding.

Figure 10:
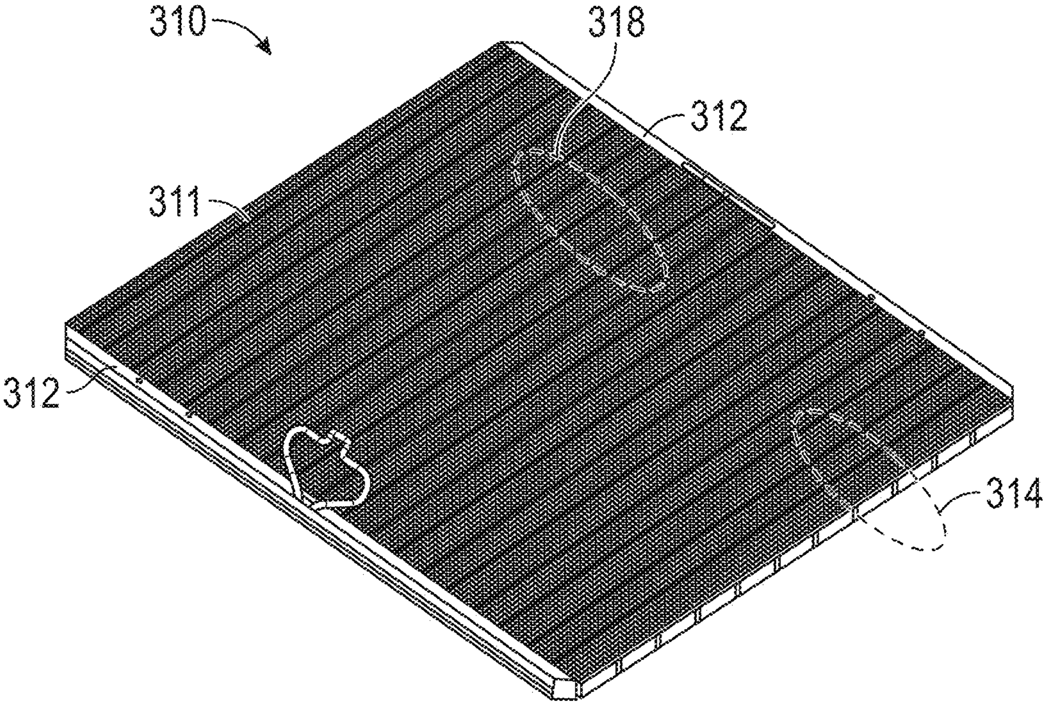
FIG. 10 shows a screening assembly in an embodiment.

FIG. 10 illustrates one embodiment of a screen assembly 310 that may be used with the screening apparatuses and screening modules disclosed above. Such a screen assembly 310 may be incorporated into the screening apparatuses as well as screen assemblies placed in a rewetting trough. In the illustrated embodiment, screen assembly 310 has multiple individual screen elements 316 (See, e.g., FIG. 11) mounted on subgrid structures (See FIG. 13). The subgrid structures may include multiple independent end subgrid units 314 and multiple independent center subgrid units 318 that are secured together to form a grid framework having grid openings. In FIG. 10, multiple independent subgrids 314 and 318 are secured together to form the screen assembly 310. Screen assembly 310 has a continuous screen assembly screening surface 311 that includes multiple screen element screening surfaces. The screen assembly may extend between first and second edges 312 which may include first and second gaskets or compressible seals (not shown). In an alternate embodiment, the screen assembly may include a thermoplastic screen surface mounted on an upper surface of a frame. For instance, the thermoplastic screen surface may be adhered to an upper surface of a perforated plate.

Figure 11:
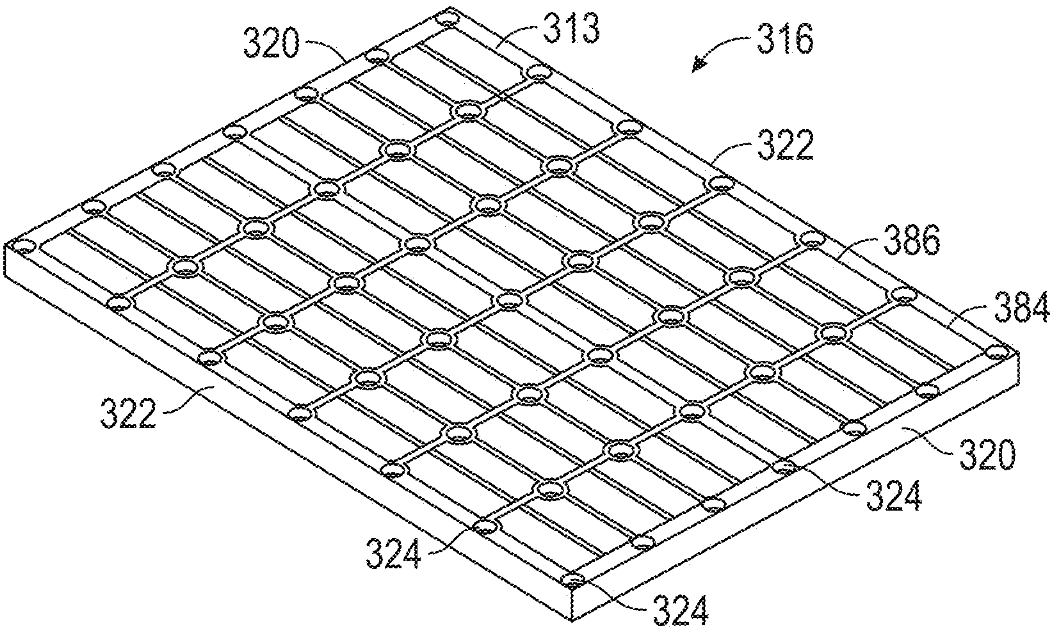
FIG. 11 shows a screen element of the screening assembly of FIG. 10, in an embodiment.
Figure 12:
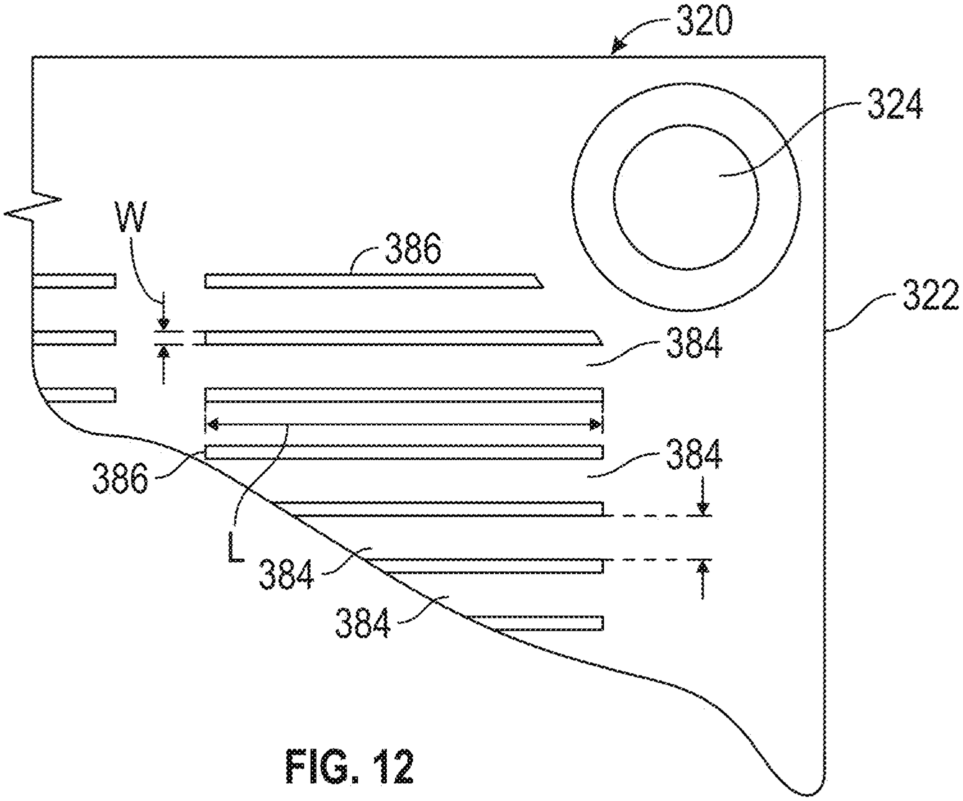
FIG. 12 shows an enlarged view of a portion of a top surface of the screen element of FIG. 11, in an embodiment.
Figure 13:
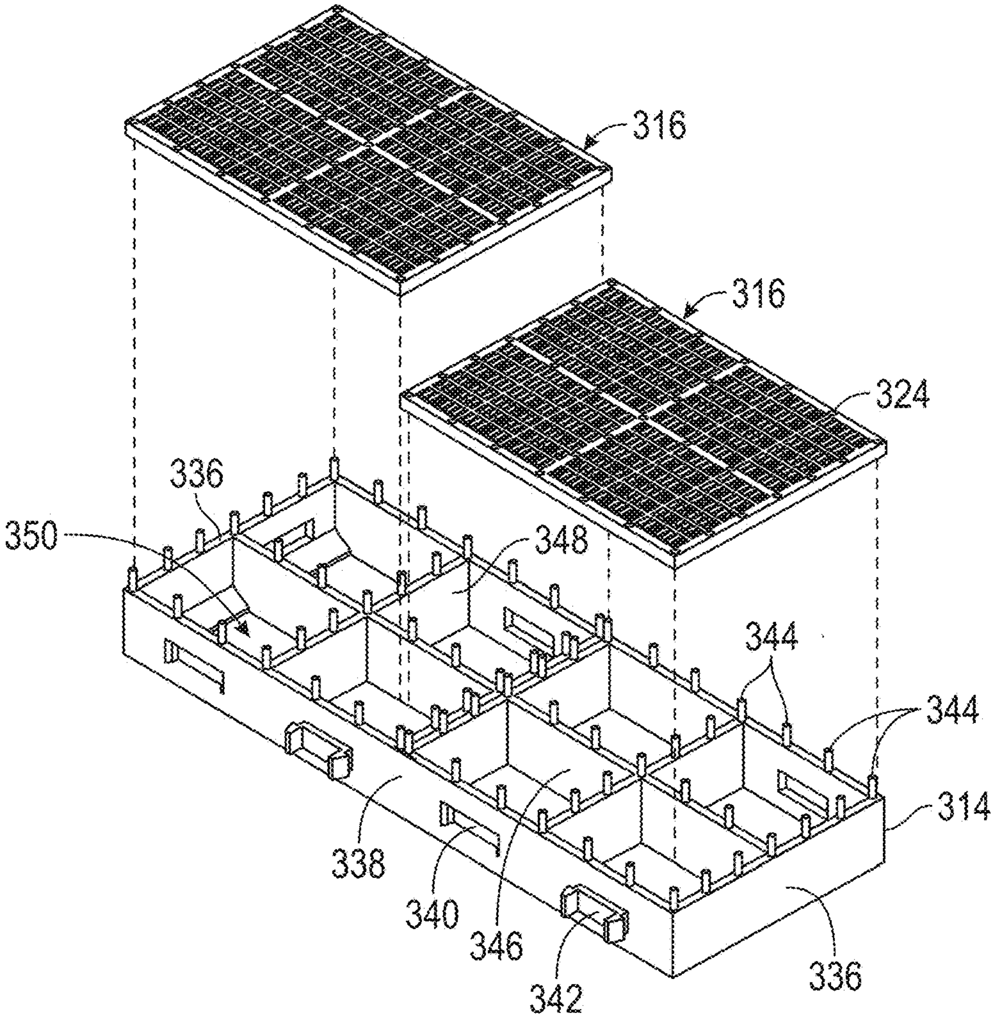
FIG. 13 shows a screening assembly sub-grid structure, in an embodiment.

FIG. 11 shows a screen element 316 having substantially parallel screen element end portions 320 and substantially parallel screen element side portions 322 that are substantially perpendicular to the screen element end portions 320. The screen element screening surface 313 includes surface elements 384 running parallel to the screen element end portions 320 and forming screening openings 386. See FIG. 12. Surface elements 384 have a thickness T, which may vary depending on the screening application and configuration of the screening openings 386. T may be, e.g., approximately 43 microns to approximately 4000 microns depending on the open screening area desired and the width W of screening openings 386. The screening openings 386 are elongated slots having a length L and a width W, which may be varied for a chosen configuration. The width may be a distance of approximately 43 microns to approximately 4000 microns between inner surfaces of each screen surface element 384. The screening openings are not required to be rectangular but may be thermoplastic injection molded to any shape suitable to a particular screening application, including approximately square, circular and/or oval. For increased stability, the screen surface elements 384 may include integral fiber materials which may run substantially parallel to end portions. The fiber may be an aramid fiber (or individual filaments thereof), a naturally occurring fiber or other material having a relatively high tensile strength. The screen element 316 may include attachment apertures 324 configured such that elongated attachment members 344 of a subgrid may pass through the attachment apertures 324. See. FIG. 13. Screen element 316 may be a single thermoplastic injection molded piece. Screen element 316 may also be multiple thermoplastic injection molded pieces, each configured to span one or more grid openings. In an embodiment, the screen element screening surface 313 has an open screening area of approximately 5% to approximately 35% of a total area of the screening element. In a further embodiment, the screen element screening surface 313 has an open screening area of approximately 5% to approximately 45% of a total area of the screening element. Continuous screening surfaces formed by a plurality of the screening elements may have similar or identical open screening areas of the total area of the continuous screening surface.

Figure 14:
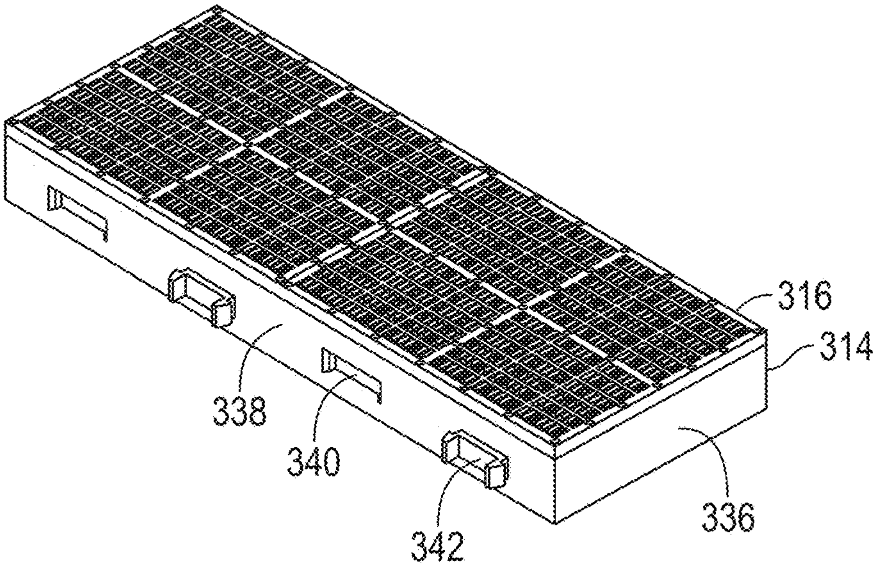
FIG. 14 shows screening elements mounted to a sub-grid structure, in an embodiment.

FIG. 13 illustrates a subgrid 314 unit. The end subgrid unit 314 includes parallel subgrid end members 336 and parallel subgrid side members 338 substantially perpendicular to the subgrid end members 336. The end subgrid unit 314 has fasteners along one subgrid end member 336 and along the subgrid side members 338. The fasteners may be clips 342 and clip apertures 340 such that multiple subgrid units 314 may be securely attached together. The subgrid units may be secured together along their respective side members 338 by passing the clip 342 into the clip aperture 340 until extended members of the clip 342 extend beyond clip aperture 340 and subgrid side member 338. As the clip 342 is pushed into the clip aperture 340, the clip's extended members will be forced together until a clipping portion of each extended member is beyond the subgrid side member 338 allowing the clipping portions to engage an interior portion of the subgrid side member 338. When the clipping portions are engaged into the clip aperture, subgrid side members of two independent subgrids will be side by side and secured together. The subgrids may be separated by applying a force to the clip's extended members such that the extended members are moved together allowing for the clipping portions to pass out of the clip aperture. Alternatively, the clips 342 and clip apertures 340 may be used to secure subgrid end member 336 to a subgrid end member of another subgrid, such as a center subgrid. The end subgrid may have a subgrid end member 336 that does not have any fasteners. Although the fasteners shown in drawings are clips and clip apertures, alternative fasters and alternative forms of clips and apertures may be used, including other mechanical arrangements, adhesives, etc. FIG. 14, illustrate two screen elements attached to a subgrid 314. Thermoplastic screen assemblies in accordance with the disclosed screen assemblies are set forth in U.S. Pat. No. 11,161,150, the entire contents of which is incorporated herein by reference.

Though the screening apparatuses are discussed above as utilizing a thermoplastic screen in an embodiment, it will be appreciated that other screen materials may be utilized in other embodiments. By way of example, screens formed of thermoset materials (e.g., urethane screens and/or polyurethane screens) may be utilized with the various slurry screening apparatuses described above. In such embodiments, thermoset material screens may be pretensioned over a rigid frame. The resulting screen assembly (e.g., frame and pretensioned screen) may then be attached to a slurry screening apparatus in any appropriate manner. By way of example, such screen assemblies may be fastened to the slurry screening apparatus using wedges or other fasteners, including without limitation, bolts, clamps and/or bladder hold-down arrangements.

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure. As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the scope of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A static screening apparatus for separating oversized materials from undersized materials under the force of gravity, comprising:

- a first screening module;
- a second screening module stacked vertically above the first screening module, wherein each screening module includes:
  - a first sidewall and a second sidewall spaced from the first sidewall, the first and second sidewalls extending from an inlet end to an outlet end, wherein the outlet end is disposed below the inlet end and wherein at least one of the first sidewall and the second sidewall includes at least one screening bed access opening between its upper edge and its lower edge;
  - cross-support members disposed between opposing inside surfaces of first and second sidewalls and between upper and lower edges of the first and second sidewalls the cross-support members defining a concave screening bed;
  - guide members disposed across at least a portion of a distance between opposing inside surfaces of first and second sidewalls; and
  - a plurality of removable screen assemblies each having a thermoplastic screening surface, wherein the plurality of screen assemblies collectively define a concave screening surface and wherein each screen assembly includes an engagement element to slidably engage at least one guide member when the screen assembly is inserted through the screening bed access opening for disposition between the first and second sidewalls; and a bottom surface extending between lower edges of the sidewalls, wherein undersized materials passing through the concave screening surface are collected on the bottom surface and exit though a discharge proximate to a lower end of the bottom surface and oversized materials exit over a lower end of the concave screening surface.

2. The apparatus of claim 1, wherein each screening assembly is a flat screening assembly and wherein each flat screening assembly is disposed at an angle relative to at least one adjacent flat screening assembly.

3. The apparatus of claim 1, wherein the first screening module forms a first flow path through the apparatus and the second screening module forms a separate second flow path through the apparatus.

4. The apparatus of claim 1, wherein at least a portion of the guide members are each integrally formed with a cross-support member.

5. The apparatus of claim 4, wherein the guide members are positioned to be engaged through the at least one screening bed access opening.

6. The apparatus of claim 1, wherein each thermoplastic screening surface has openings with sizes in a range from approximately 35 microns to approximately 4,000 microns.

7. The apparatus of claim 5, wherein each thermoplastic screening surface has an open screening area of approximately 5% to approximately 35% of a total area of the thermoplastic screening surface.

8. The apparatus of claim 1, wherein each thermoplastic screening surface comprises a plurality of independent injection molded thermoplastic screen elements configured to be secured to a support structure to form a continuous screening surface.

9. A static screening system for separating oversized materials from undersized materials under the force of gravity, comprising:

a screening module, wherein the screening module includes:

a first sidewall and a second sidewall spaced from the first sidewall, the first and second sidewalls extending from an inlet end to an outlet end, wherein the inlet end is disposed above the outlet end and wherein at least one sidewall of the first sidewall and the second sidewall includes a screening bed access opening between its upper edge and its lower edge;

a plurality of cross-support members disposed between opposing inside surfaces of first and second sidewalls and between upper and lower edges of the first and second sidewalls, the cross-support members defining a concave screening bed;

guides disposed across at least a portion of a distance between opposing inside surfaces of first and second sidewalls; and a bottom surface extending between lower edges of the sidewalls; and a screening assembly configured for receipt on the concave screening bed, wherein the screening assembly includes:

a screening surface; and at least one engagement element connected to the screening surface and configured for slidable engagement with at least one guide when the screen assembly is inserted through the screening bed access opening for disposition between the first and second sidewalls; and wherein undersized materials passing through the screening assembly are collected on the bottom surface of the screening module and exit though a discharge port proximate to a lower end of the bottom surface and oversized materials exit over a lower end of the screening assembly.

10. The screening system of claim 9, wherein the screening assembly comprises a plurality of individual screening assemblies, wherein the plurality of individual screen assemblies collectively define a concave screening surface.

11. The screening system of claim 10, wherein each of the plurality of individual screening assemblies is a flat screening assembly and wherein each flat screening assembly is disposed at an angle relative to at least one adjacent flat screening assembly.

12. The screening system of claim 9, wherein the screening surface comprises a thermoplastic screening surface.

13. The screening system of claim 9, wherein the thermoplastic screening surface has openings with sizes in a range from approximately 35 microns to approximately 4,000 microns.

14. The screening system of claim 12, wherein the thermoplastic screening surface has an open screening area of approximately 5% to approximately 35% of a total area of the thermoplastic screening surface.

15. The screening system of claim 12, wherein the thermoplastic screening surface comprises a plurality of independent injection molded thermoplastic screen elements secured to a support structure to form a continuous screening surface.

16. The screening system of claim 9, wherein at least a portion of the guide members are each integrally formed with a cross-support member.

17. The screening system of claim 9, wherein the guide members are positioned to be engaged through the screening bed access opening.

18. A static screening system for separating oversized materials from undersized materials under the force of gravity, the system comprising:

a first screening module;

a second screening module stacked vertically above the first screening module;

wherein each screening module includes:

a first sidewall and a second sidewall spaced from the first sidewall, the first and second sidewalls extending from an inlet end to an outlet end, wherein the inlet end is disposed above the outlet end;

support members disposed between opposing inside surfaces of first and second sidewalls and between upper and lower edges of the first and second sidewalls, the support members defining a screening bed; and a bottom surface extending between lower edge of the sidewalls;

a first removable screening assembly for attachment to the first module; and a second removable screening assembly for attachment to the second module, wherein each removable screening assembly includes:

a concave screening surface over a length of the screening assembly between a screening surface inlet end and a screening surface outlet end; and a support structure for supporting the screening surface; and wherein undersized materials passing through the screening surfaces are collected on the bottom surfaces of the first and second modules and oversized materials exit over top surfaces of the first and second removeable screening assemblies.

19. The system of claim 18, wherein each removable screening assembly comprises:

a plurality of flat screening assemblies, wherein each flat screening surface is disposed at an angle relative to at least one adjacent flat screening surface, wherein the plurality of flat screening surfaces collectively define the concave screening surface.

20. The system of claim 18, wherein the first screening module forms a first flow path through the system and the second screening module forms a separate second flow path through the system.

21. The system of claim 18, further comprising:

a first inlet feeder configured to provide unscreened material to an upper surface of a first screening surface of the first screening module; and a second inlet feeder configured to provide unscreened material to an upper surface of a second screening surface of the second screening module.

22. The system of claim 18, wherein at least one sidewall surface of the first and second sidewalls of the first screening module, stacked vertically below the second screening module comprises:

an opening in the one sidewall surface configured to permit passage of the screening assembly through the sidewall surface.

23. The system of claim 18, wherein each removable screening assembly includes a thermoplastic screening surface.

24. The system of claim 23, wherein the thermoplastic screening surface has openings with sizes in a range from approximately 35 microns to approximately 4,000 microns.

25. The system of claim 23, wherein the thermoplastic screening surface has an open screening area of approximately 5% to approximately 35% of a total area of the thermoplastic screening surface.

26. A method for screening oversized materials from undersized materials, comprising:

providing a screening module, having:

first and second spaced sidewalls with a plurality of support members extending between opposing inside surfaces of the first and second sidewalls;

a concave thermoplastic screening surface supported by the support members, the concave thermoplastic screening surface extending between an inlet end and an outlet end; and a bottom surface extending between the first and second sidewalls at a location below the concave thermoplastic screening surface;

introducing unscreened materials to an upper edge of the concave thermoplastic screening surface;

allowing the unscreened materials to migrate down the concave thermoplastic screening surface under the force of gravity;

passing undersized materials pass the concave thermoplastic screening surface while the unscreened materials migrate down a top surface of the concave thermoplastic screening surface;

collecting the undersized materials passing through the thermoplastic screening surface on the solid bottom surface extending between the first and second sidewalls;

diverting the undersized materials collected on the solid bottom surface of screening module to an undersized materials discharge; and diverting oversized materials passing over an outlet end of a top surface of the concave thermoplastic screening surface to an oversized materials discharge.

27. The method of claim 26, wherein passing the undersized materials through the concave thermoplastic screening surface comprises:

passing the undersized materials through a screen having openings with sizes in a range from approximately 35 microns to approximately 4,000 microns.

28. The method of claim 26, wherein passing the undersized materials through the concave thermoplastic screening surface comprises:

passing the undersized materials through a screen having an open screening area of approximately 5% to approximately 35% of a total area of the synthetic screen.

29. The method of claim 26, wherein allowing the unscreened materials to migrate down the concave thermoplastic screening surface under the force of gravity comprises:

allowing the unscreened materials to pass over a plurality of flat screening surfaces disposed adjacent to one another, wherein the plurality of flat screening surfaces collectively define the concave thermoplastic screening surface.

30. The method of claim 26, wherein providing the screening module further comprises:

inserting a plurality of individual thermoplastic screening surfaces through an opening extending through one of the first and second sidewall surfaces, wherein the plurality of individual thermoplastic screening surface collectively define the concave thermoplastic screening surface.

* * * * *